United States Patent
Kneckt et al.

(10) Patent No.: US 12,232,021 B2
(45) Date of Patent: Feb. 18, 2025

(54) BEACON AND PROBE-RESPONSE FRAME TYPE INFORMATION FOR OUT-OF-BAND DISCOVERY

(71) Applicant: Apple Inc., Cupertino, CA (US)

(72) Inventors: Jarkko L Kneckt, Los Gatos, CA (US); Veerendra Boodannavar, Cupertino, CA (US); Charles F Dominguez, San Carlos, CA (US); Yong Liu, Campbell, CA (US); Su Khiong Yong, Palo Alto, CA (US); Tianyu Wu, Fremont, CA (US); Daniel R. Borges, San Francisco, CA (US); Sundar Sriram, Sunnyvale, CA (US); Oren Shani, Saratoga, CA (US); Yoel Boger, Shoham (IL); Anuj Batra, Redwood City, CA (US); Debashis Dash, San Jose, CA (US); Matthew L Semersky, San Jose, CA (US); Ahmet G. Cepni, Sunnyvale, CA (US); Noam Ginsburg, Haifa (IL)

(73) Assignee: Apple Inc., Cupertino, CA (US)

(*) Notice: Subject to any disclaimer, the term of this patent is extended or adjusted under 35 U.S.C. 154(b) by 468 days.

(21) Appl. No.: 17/842,314

(22) Filed: Jun. 16, 2022

(65) Prior Publication Data
US 2022/0408237 A1 Dec. 22, 2022

Related U.S. Application Data

(63) Continuation of application No. 17/841,064, filed on Jun. 15, 2022.
(Continued)

(51) Int. Cl.
H04W 8/00 (2009.01)
H04W 48/16 (2009.01)
(Continued)

(52) U.S. Cl.
CPC .......... *H04W 48/16* (2013.01); *H04W 8/005* (2013.01); *H04W 76/15* (2018.02); *H04W 76/19* (2018.02); *H04W 84/12* (2013.01)

(58) Field of Classification Search
None
See application file for complete search history.

(56) References Cited

U.S. PATENT DOCUMENTS

| 8,885,627 B2 | 11/2014 | Gong |
| 11,109,377 B2 | 8/2021 | Gilmore |

(Continued)

FOREIGN PATENT DOCUMENTS

| EP | 3790353 | 3/2021 |
| WO | 2018213049 | 11/2018 |

OTHER PUBLICATIONS

International Search Report and Written Opinion for PCT Patent Application No. PCT/US2022/033813; 16 pages; Sep. 22, 2022.
(Continued)

*Primary Examiner* — Minh Trang T Nguyen
(74) *Attorney, Agent, or Firm* — Kowert, Hood, Munyon, Rankin & Goetzel, P.C.

(57) ABSTRACT

During operation, an electronic device may perform, using a scanning radio, a scan of a band of frequencies, where the scanning radio only receives frames. Then, the electronic device may receive, using the scanning radio, a beacon frame associated with a second electronic device, where the beacon frame includes information associated with operation of a third electronic device in a second band of frequencies. Next, the electronic device may perform, using a data radio, a second scan of the second band of frequencies based at least in part on the information, where the data radio transmits and/or receives second frames, and where the second scan is performed, at least in part, while the scan is performed. Note that the electronic device may not be
(Continued)

associated with (or may not have a connection with) the second electronic device and/or the third electronic device.

20 Claims, 35 Drawing Sheets

Related U.S. Application Data

(60) Provisional application No. 63/212,007, filed on Jun. 17, 2021.

(51) Int. Cl.
*H04W 76/15* (2018.01)
*H04W 76/19* (2018.01)
*H04W 84/12* (2009.01)

(56) References Cited

U.S. PATENT DOCUMENTS

| | | | |
|---|---|---|---|
| 11,115,813 | B1 | 9/2021 | Parker |
| 11,297,516 | B2 | 4/2022 | Yu |
| 2005/0255847 | A1* | 11/2005 | Han ............... H04W 36/00835 455/442 |
| 2013/0142187 | A1* | 6/2013 | Gong .................. H04W 48/16 370/338 |
| 2020/0221545 | A1 | 7/2020 | Stacey |
| 2020/0252339 | A1* | 8/2020 | McKeefery ............. G01P 1/127 |
| 2020/0252859 | A1* | 8/2020 | McKeefery ............. H04W 4/48 |
| 2021/0051574 | A1 | 2/2021 | Chu |
| 2022/0201596 | A1* | 6/2022 | Zhou .................. H04W 48/16 |
| 2022/0240339 | A1 | 7/2022 | Zheng |
| 2022/0303993 | A1 | 9/2022 | Adachi |
| 2023/0180105 | A1* | 6/2023 | Vellore ............... H04W 48/10 |

OTHER PUBLICATIONS

Cariou et al. "Multi-Link Discovery—part 2"; IEEE 802.11-20-0390r0; 12 pages; Feb. 13, 2020.

Jang et al. "Discussion on Multi-link Setup"; IEEE 802.11-19-1509r5; 13 pages; Sep. 16, 2019.

Jang et al. "Indication of Multi-link Information"; IEEE 802.11-20/00028r6; 14 pages; Jan. 13, 2020.

* cited by examiner

FIG. 34

BSS PARAMETERS SUBFIELD 3410

| OCT RECOMM. | SAME SSID | MULTIPLE BSSID | MEMBER OF ESS WITH 2.4/5 GHz CO-LOCATED ACCESS POINT | UNSOLICITED PROBE RESPONSE ACTIVITY | CO-LOCATED ACCESS POINT | OTHER THAN NON-HT BEACON |
|---|---|---|---|---|---|---|
| 1 | 1 | 1 | 1 | 1 | 1 | 1 |

BITS

FIG. 35

MLD PARAMETERS SUBFIELD 3510

| MLD IDENTIFIER | LINK IDENTIFIER | CHANGE SEQUENCE | LARGER THAN 20 MHz PPDU | PRE-ASSOCIATED LONG RANGE | RESERVED |
|---|---|---|---|---|---|
| 8 | 4 | 8 | 1 | 1 | 2 |

BITS

BEACON AND PROBE-RESPONSE FRAME TYPE INFORMATION FOR OUT-OF-BAND DISCOVERY

CROSS-REFERENCE TO RELATED APPLICATION

This application is a continuation of U.S. patent application Ser. No. 17/841,064, entitled "Beacon and Probe-Response Frame Type Information for Out-of-Band Discovery," by Jarkko L. Kneckt, et al., filed Jun. 15, 2022 claims the benefit of U.S. Provisional Application No. 63/212,007, entitled "Beacon and Probe-Response Frame Type Information for Out-of-Band Discovery," by Jarkko L. Kneckt, et al., filed Jun. 17, 2021, the contents of which are hereby incorporated by reference.

FIELD

The described embodiments relate, generally, to wireless communications among electronic devices, including communication techniques for out-of-band communication of beacon and probe-response information.

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi').

IEEE 802.11be has proposed the use of multiple concurrent links between electronic devices, such as an access point and an associated client or station. These concurrent links may be in different bands of frequencies, such as 2.4, 5 and/or 6 GHz bands of frequencies. However, the proposed concurrent use of multiple bands of frequencies raises challenges with electronic-device and link discovery, as well as setup or configuration of multi-link electronic devices and legacy (single-link) electronic devices.

SUMMARY

In a first group of embodiments, an electronic device that performs a scan is described. This electronic device may include: an antenna node (or a pad or a connector) that is communicatively coupled to an antenna; and a data radio communicatively coupled to the antenna node. During operation, the data radio performs the scan of a band of frequencies, where the data radio transmits and/or receives frames. Moreover, the data radio receives a beacon frame associated with a second electronic device, where the beacon frame includes information associated with operation of a third electronic device in a second band of frequencies.

Note that the electronic device may not be associated with (or may not have a connection with) the second electronic device and/or the third electronic device.

Moreover, the second electronic device and the third electronic device may include access points that are co-hosted or co-located in, or affiliated with, an access point multi-link device (AP MLD).

Furthermore, the beacon frame may include a reduced neighbor report (RNR) and the RNR may include the information. Additionally, the beacon frame may include a multi-link (ML) element and the ML may include the information.

In some embodiments, the electronic device may include a second data radio and a scanning radio. The second data radio may transmit and/or receive second frames and the scanning radio may only receive third frames. Moreover, the electronic device may perform a second scan of the second band of frequencies using the second data radio or the scanning radio based at least in part on the information. Note that the second scan may be performed, at least in part, while the scan is performed. Furthermore, the electronic device may associate with the second electronic device while the second scan is performed.

Additionally, the information may include: a primary channel of the third electronic device, a bandwidth of the beacon frame, and/or an indication of whether the third electronic device can receive an 80 MHz wide non-high-throughput duplicate physical layer convergence protocol (PLCP) protocol data unit (PPDU).

Other embodiments provide the second electronic device or the third electronic device that performs counterpart operations corresponding to at least some of the aforementioned operations performed by the electronic device.

Other embodiments provide an integrated circuit (which is sometimes referred to as a 'communication circuit') for use with the electronic device, the second electronic device or the third electronic device. The integrated circuit may perform at least some of the aforementioned operations or counterpart operations corresponding to at least some of the aforementioned operations.

Other embodiments provide the data radio, the second data radio and/or the scanning radio that perform at least some of the aforementioned operations or counterpart operations corresponding to at least some of the aforementioned operations.

Other embodiments provide a computer-readable storage medium for use with the electronic device, the second electronic device or the third electronic device. When program instructions stored in the computer-readable storage medium are executed by the electronic device, the second electronic device or the third electronic device, the program instructions may cause the electronic device, the second electronic device or the third electronic device to perform at least some of the aforementioned operations performed by the electronic device or counterpart operations performed by the second electronic device or the third electronic device.

Other embodiments provide a method for performing the scan. The method includes at least some of the aforementioned operations performed by the electronic device or counterpart operations performed by the second electronic device or the third electronic device.

In a second group of embodiments, an electronic device that performs a scan is described. This electronic device may include: an antenna node (or a pad or a connector) that is communicatively coupled to an antenna; a second antenna node (or a pad or a connector) that is communicatively couple to a second antenna; a scanning radio communicatively coupled to the antenna node; and a data radio communicatively coupled to the second antenna node. During operation, the electronic device performs, using the scanning radio, the scan of a band of frequencies, where the scanning radio only receives frames. Then, the electronic device receives, using the scanning radio, a beacon frame associated with a second electronic device, where the beacon frame includes information associated with operation of a third electronic device in a second band of frequencies. Next, the electronic device performs, using the data radio, a second scan of the second band of frequencies based at least in part on the information, where the data radio transmits and/or receives second frames, and where the second scan is performed, at least in part, while the scan is performed.

Note that the electronic device may not be associated with (or may not have a connection with) the second electronic device and/or the third electronic device.

Moreover, the second electronic device and the third electronic device may include access points that are co-hosted or co-located in, or affiliated with, an AP MLD.

Furthermore, the beacon frame may include an RNR and the RNR may include the information. Additionally, the beacon frame may include an ML element and the ML may include the information.

Additionally, the electronic device may associate with (or establish a connection with) the third electronic device after the scan and the second scan are completed.

In some embodiments, the information may include: a primary channel of the third electronic device, a bandwidth of the beacon frame, and/or an indication of whether the third electronic device can receive an 80 MHz wide non-high-throughput duplicate PPDU.

Other embodiments provide the second electronic device or the third electronic device that performs counterpart operations corresponding to at least some of the aforementioned operations performed by the electronic device.

Other embodiments provide an integrated circuit (which is sometimes referred to as a 'communication circuit') for use with the electronic device, the second electronic device or the third electronic device. The integrated circuit may perform at least some of the aforementioned operations or counterpart operations corresponding to at least some of the aforementioned operations.

Other embodiments provide the scanning radio and/or the data radio that perform at least some of the aforementioned operations or counterpart operations corresponding to at least some of the aforementioned operations.

Other embodiments provide a computer-readable storage medium for use with the electronic device, the second electronic device or the third electronic device. When program instructions stored in the computer-readable storage medium are executed by the electronic device, the second electronic device or the third electronic device, the program instructions may cause the electronic device, the second electronic device or the third electronic device to perform at least some of the aforementioned operations performed by the electronic device or counterpart operations performed by the second electronic device or the third electronic device.

Other embodiments provide a method for performing the scan. The method includes at least some of the aforementioned operations performed by the electronic device or counterpart operations performed by the second electronic device or the third electronic device.

In a third group of embodiments, an electronic device that performs a scan is described. This electronic device may include: an antenna node (or a pad or a connector) that is communicatively coupled to an antenna; a second antenna node (or a pad or a connector) that is communicatively couple to a second antenna; a data radio communicatively coupled to the antenna node; and a second data radio communicatively coupled to the second antenna node. During operation, the electronic device communicates, using the data radio, frames in a band of frequencies that are associated with a second electronic device, where the data radio transmits and/or receives the frames. Then, the electronic device interrupts the communication of the frames and performs, using the second data radio, the scan of a second band of frequencies, where the second data radio transmits and/or receives second frames. Moreover, the electronic device receives, using the second data radio, a beacon frame associated with a third electronic device in the second band of frequencies. Next, after the beacon frame is received, the electronic device resumes communication of third frames in the band of frequencies using the data radio.

Note that the electronic device may be associated with (or may have a connection with) the second electronic device.

Moreover, the second electronic device and the third electronic device may include access points that are co-hosted or co-located in, or affiliated with, an AP MLD.

Furthermore, the frames may include a frame that includes information associated with operation of the third electronic device in the second band of frequencies and the scan is based at least in part on the information. Additionally, the frame may include a group-addressed frame. In some embodiments, the frame may include an RNR and the RNR may include the information. Note that the frame may include an ML element and the ML may include the information.

Moreover, the information may include: a primary channel of the third electronic device, a bandwidth of the beacon frame, and/or an indication of whether the third electronic device can receive an 80 MHz wide non-high-throughput duplicate PPDU.

Other embodiments provide the second electronic device or the third electronic device that performs counterpart operations corresponding to the aforementioned operations performed by the electronic device.

Other embodiments provide an integrated circuit (which is sometimes referred to as a 'communication circuit') for use with the electronic device, the second electronic device or the third electronic device. The integrated circuit may perform at least some of the aforementioned operations or counterpart operations corresponding to at least some of the aforementioned operations.

Other embodiments provide the data radio and/or the second data radio that perform at least some of the aforementioned operations or counterpart operations corresponding to at least some of the aforementioned operations.

Other embodiments provide a computer-readable storage medium for use with the electronic device, the second electronic device or the third electronic device. When program instructions stored in the computer-readable storage medium are executed by the electronic device, the second electronic device or the third electronic device, the program instructions may cause the electronic device, the second electronic device or the third electronic device to perform at least some of the aforementioned operations performed by the electronic device or counterpart operations performed by the second electronic device or the third electronic device.

Other embodiments provide a method for performing the scan. The method includes at least some of the aforementioned operations performed by the electronic device or counterpart operations performed by the second electronic device or the third electronic device.

In a fourth group of embodiments, an electronic device that performs a scan is described. This electronic device may include: an antenna node (or a pad or a connector) that is communicatively coupled to an antenna; a second antenna node (or a pad or a connector) that is communicatively couple to a second antenna; a scanning radio communicatively coupled to the antenna node; and a data radio communicatively coupled to the second antenna node. During operation, the electronic device communicates, using the data radio, frames in a band of frequencies that are associated with a second electronic device, where the data radio is configured to transmit and/or receive the frames. Then, the electronic device performs, using the scanning radio, the scan of a second band of frequencies, where the scanning radio only receives second frames and the scan is performed when the frames are communicated. Next, the electronic device receives, using the scanning radio, a beacon frame associated with a third electronic device in the second band of frequencies.

Note that the electronic device may be associated with (or may have a connection with) the second electronic device.

Moreover, the second electronic device and the third electronic device may include access points that are co-hosted or co-located in, or affiliated with, an AP MLD.

Furthermore, the frames may include a frame that includes information associated with operation of the third electronic device in the second band of frequencies and the scan is based at least in part on the information. Additionally, the frame may include a group-addressed frame. In some embodiments, the frame may include an RNR and the RNR may include the information. Note that the frame may include an ML element and the ML may include the information.

Moreover, the information may include: a primary channel of the third electronic device, a bandwidth of the beacon frame, and/or an indication of whether the third electronic device can receive an 80 MHz wide non-high-throughput duplicate PPDU.

Other embodiments provide the second electronic device or the third electronic device that performs counterpart operations corresponding to the aforementioned operations performed by the electronic device.

Other embodiments provide an integrated circuit (which is sometimes referred to as a 'communication circuit') for use with the electronic device, the second electronic device or the third electronic device. The integrated circuit may perform at least some of the aforementioned operations or counterpart operations corresponding to at least some of the aforementioned operations.

Other embodiments provide the scanning radio and/or the data radio that perform at least some of the aforementioned operations or counterpart operations corresponding to at least some of the aforementioned operations.

Other embodiments provide a computer-readable storage medium for use with the electronic device, the second electronic device or the third electronic device. When program instructions stored in the computer-readable storage medium are executed by the electronic device, the second electronic device or the third electronic device, the program instructions may cause the electronic device, the second electronic device or the third electronic device to perform at least some of the aforementioned operations performed by the electronic device or counterpart operations performed by the second electronic device or the third electronic device.

Other embodiments provide a method for performing the scan. The method includes at least some of the aforementioned operations performed by the electronic device or counterpart operations performed by the second electronic device or the third electronic device.

In a fifth group of embodiments, an electronic device that transmits a beacon or a group-addressed frame is described. This electronic device may include: an antenna node (or a pad or a connector) that is communicatively coupled to an antenna; and an interface circuit communicatively coupled to the antenna node. During operation, the interface circuit transmits the beacon or the group-addressed frame in a band of frequencies, where the beacon frame includes information specifying a beacon frame type and/or a beacon modulation coding scheme (MCS), and where the group-addressed frame includes second information specifying a group-addressed-frame type and/or a group-addressed frame MCS.

Note that the electronic device may include an access point.

Moreover, the interface circuit may be associated with an access point co-hosted or co-located in, or affiliated with, an AP MLD with a second access point in a second band of frequencies. Furthermore, the electronic device may transmit a second beacon or a second group-addressed frame in the second band of frequencies, where the second beacon includes third information specifying a second beacon frame type and/or a second beacon MCS, where the second group-addressed frame includes third information specifying a second group-addressed-frame type and/or a second group-addressed frame MCS, and where one of: the second beacon frame type is different from the beacon frame type; the second beacon MCS is different from the beacon MCS; the second group-addressed-frame type is different from the group-addressed-frame type; or the second group-addressed-frame MCS is different from the group-addressed-frame MCS.

Additionally, the information may include the beacon bandwidth and the second information may include the group-addressed-frame bandwidth.

Other embodiments provide the integrated circuit (which is sometimes referred to as a 'communication circuit') for use with the electronic device. The integrated circuit may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations performed by the electronic device.

Other embodiments provide a method for transmitting the beacon or the group-addressed frame. The method includes at least some of the aforementioned operations performed by the electronic device.

In a sixth group of embodiments, a second electronic device that receives a beacon or a group-addressed frame is described. This second electronic device may include: an antenna node (or a pad or a connector) that is communicatively coupled to an antenna; and an interface circuit communicatively coupled to the antenna node. During operation, the interface circuit receives, associated with an electronic device, the beacon or the group-addressed frame in a band of frequencies, where the beacon frame includes information specifying a beacon frame type and/or a beacon MCS, and where the group-addressed frame includes second information specifying a group-addressed-frame type and/or a group-addressed frame MCS.

Note that the electronic device may include an access point. Moreover, the access point may be co-hosted or co-located in, or affiliated with, the electronic device in an AP MLD.

Furthermore, the second electronic device may receive the group-addressed frame using a data radio based at least in part on the second information, where the data radio transmits and/or receives frames.

Additionally, the information may include the beacon bandwidth and the second information may include the group-addressed-frame bandwidth.

Other embodiments provide the integrated circuit (which is sometimes referred to as a 'communication circuit') for use with the second electronic device. The integrated circuit may perform at least some of the aforementioned operations.

Other embodiments provide the data radio that performs at least some of the aforementioned operations.

Other embodiments provide a computer-readable storage medium for use with the second electronic device. When program instructions stored in the computer-readable storage medium are executed by the second electronic device, the program instructions may cause the second electronic device to perform at least some of the aforementioned operations performed by the second electronic device.

Other embodiments provide a method for receiving the beacon or the group-addressed frame. The method includes at least some of the aforementioned operations performed by the second electronic device.

In a seventh group of embodiments, an electronic device that transmits a frame is described. This electronic device may include: an antenna node (or a pad or a connector) that is communicatively coupled to an antenna; and an interface circuit communicatively coupled to the antenna node. During operation, the interface circuit transmits, addressed to a second electronic device, the frame including a transmission power control (TPC) report, where the TPC report includes a transmit power used by the electronic device for all frames in a 6 GHz band of frequencies.

Note that the electronic device may include an access point.

Moreover, the interface circuit may be associated with an access point co-hosted or co-located in, or affiliated with, an AP MLD.

Other embodiments provide the second electronic device that performs counterpart operations corresponding to at least some of the aforementioned operations.

Other embodiments provide the integrated circuit (which is sometimes referred to as a 'communication circuit') for use with the electronic device or the second electronic device. The integrated circuit may perform at least some of the aforementioned operations or counterpart operations corresponding to at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations performed by the electronic device or counterpart operations performed by the second electronic device.

Other embodiments provide a method for transmitting or receiving the frame. The method includes at least some of the aforementioned operations performed by the electronic device or counterpart operations performed by the second electronic device.

In an eighth group of embodiments, an electronic device that transmits a beacon frame is described. This electronic device may include: an antenna node (or a pad or a connector) that is communicatively coupled to an antenna; and an interface circuit communicatively coupled to the antenna node. During operation, the interface circuit transmits the beacon frame including a critical capability update flag and an RNR, where the RNR includes a change sequence number, and where the critical capability update flag and the RNR indicate an update to one of: a transmit power of the electronic device, a beacon frame type of the electronic device, or a group-addressed frame type of the electronic device.

Note that the electronic device may include an access point.

Moreover, the interface circuit may be associated with an access point co-hosted or co-located in, or affiliated with, an AP MLD.

Other embodiments provide the second electronic device that performs counterpart operations corresponding to at least some of the aforementioned operations.

Other embodiments provide the integrated circuit (which is sometimes referred to as a 'communication circuit') for use with the electronic device or the second electronic device. The integrated circuit may perform at least some of the aforementioned operations or counterpart operations corresponding to at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations performed by the electronic device or counterpart operations performed by the second electronic device.

Other embodiments provide a method for transmitting or receiving the frame. The method includes at least some of the aforementioned operations performed by the electronic device or counterpart operations performed by the second electronic device.

In a ninth group of embodiments, an electronic device that transmits a frame is described. This electronic device may include: an antenna node (or a pad or a connector) that is communicatively coupled to an antenna; and an interface circuit communicatively coupled to the antenna node. During operation, the interface circuit transmits the frame that indicates the electronic device supports requests regarding beacon or group-addressed-frame transmission mode. Then, the interface circuit receives, associated with a second electronic device, a request for information about the beacon or group-addressed-frame transmission mode. Next, the interface circuit transmits, addressed to the second electronic device, a response with the information specifying the beacon or group-addressed frame transmission mode.

Moreover, the interface circuit may be associated with an access point co-hosted or co-located in, or affiliated with, an AP MLD.

Furthermore, the second electronic device may include a station in a non-access point multi-link device (non-AP MLD).

Additionally, the request may specify a proposed beacon or group-addressed transmission mode.

In some embodiments, the response may indicate acceptance of the proposed beacon or group-addressed transmission mode, or may specify a second proposed beacon or group-addressed transmission mode.

Other embodiments provide the second electronic device that performs counterpart operations corresponding to at least some of the aforementioned operations.

Other embodiments provide the integrated circuit (which is sometimes referred to as a 'communication circuit') for use with the electronic device or the second electronic device. The integrated circuit may perform at least some of the aforementioned operations or counterpart operations corresponding to at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations performed by the electronic device or counterpart operations performed by the second electronic device.

Other embodiments provide a method for transmitting or receiving the frame. The method includes at least some of the aforementioned operations performed by the electronic device or counterpart operations performed by the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 34 is a drawing illustrating an example of an RNR.

FIG. 35 is a drawing illustrating an example of an RNR.

Note that like reference numerals refer to corresponding parts throughout the drawings. Moreover, multiple instances of the same part are designated by a common prefix separated from an instance number by a dash.

DETAILED DESCRIPTION

Figure 1:
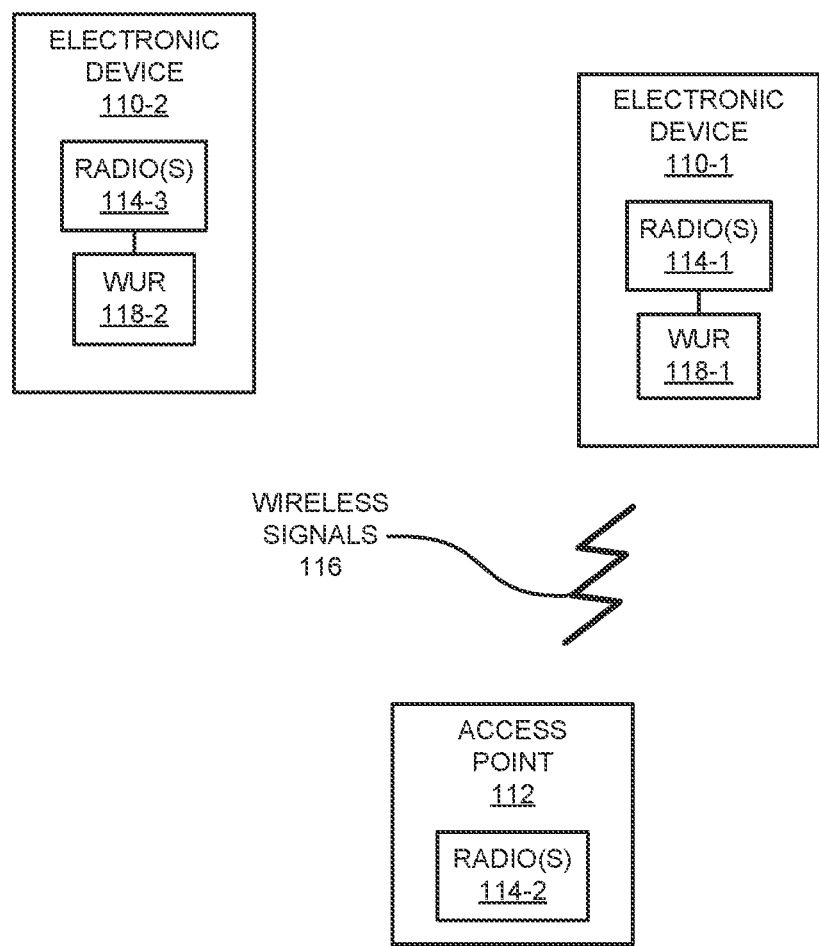
FIG. 1 is a block diagram illustrating an example of communication between electronic devices.

An electronic device that performs a scan is described. During operation, the electronic device may perform, using a scanning radio, the scan of a band of frequencies, where the scanning radio only receives frames. Then, the electronic device may receive, using the scanning radio, a beacon frame associated with a second electronic device, where the beacon frame includes information associated with operation of a third electronic device in a second band of frequencies. Next, the electronic device may perform, using a data radio, a second scan of the second band of frequencies based at least in part on the information, where the data radio transmits and/or receives second frames, and where the second scan is performed, at least in part, while the scan is performed. Note that the electronic device may not be associated with (or may not have a connection with) the second electronic device and/or the third electronic device. Moreover, note that the second scan may be performed, at least in part, while the scan is performed.

By providing the beacon frame, these communication techniques may facilitate discovery of out-of-band electronic devices. Notably, by allowing electronic devices to alert each other of other electronic devices in different bands of frequencies, the communication techniques may facilitate faster or more efficient scans. These capabilities may improve the efficiency of spectrum usage and/or the communication performance when communicating in a WLAN using the electronic device and/or the third electronic device. For example, the communication techniques may simplify and improve discovery operations, electronic-device setup and/or configuration. Consequently, the communication techniques may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, California) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, IEEE 802.11me, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have one or more connections with access point 112. For example, electronic devices 110 and access point 112 may wirelessly communicate while: detecting one another by scanning wireless channels, transmitting and receiving beacons or (equivalently) beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 43:
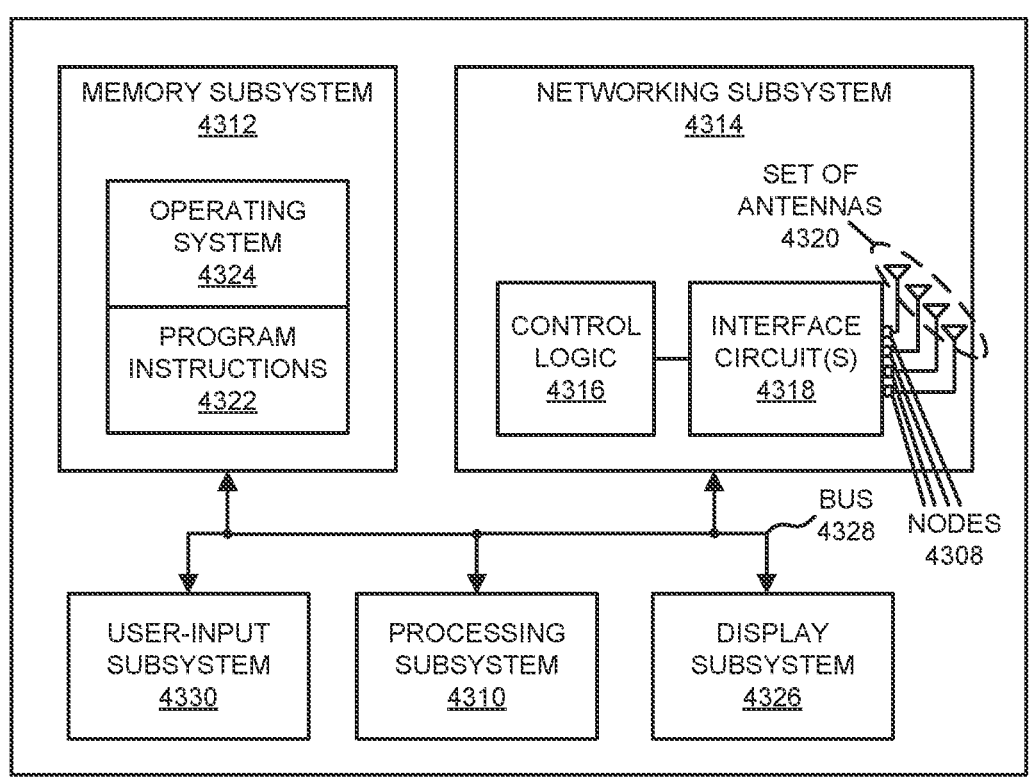
FIG. 43 is a block diagram illustrating an example of an electronic device of FIG. 1 or 2.

As described further below with reference to FIG. 43, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacon frames on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-42, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

Figure 2:
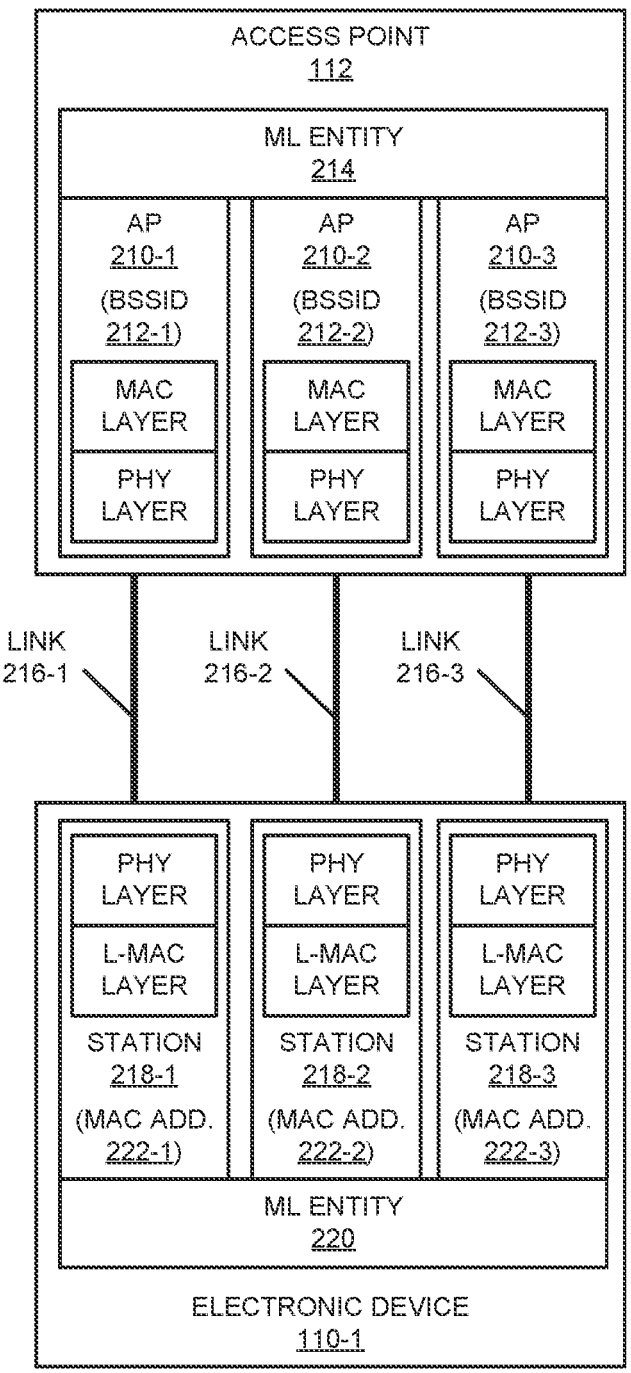
FIG. 2 is a block diagram illustrating an example of communication between electronic devices.

IEEE 802.11be has proposed the use of multiple concurrent links between electronic devices, such as access point 112 and one or more of electronic device 110. For example, as shown in FIG. 2, which presents a block diagram illustrating an example of electronic devices communicating wirelessly, access point 112 may be an AP MLD that includes multiple access points 210, which are cohosted or collocated in access point 112. In the present discussion, 'cohosted' or 'co-located' means that access points 210 are physically or virtually implemented in the same AP MLD, or are affiliated with the same AP MLD. Note that this meaning of 'cohosted' does not indicate that access points 210 have the same primary 20 MHz channel. Access points 210 may have associated basic service set identifiers (BSSIDs) 212, and media access control (MAC) and physical (PHY) layers (including separate radios, which may be included in the same or different integrated circuits). Note that access point 112 may have an ML entity 214 having an MLD MAC address, an ML identifier, a service set identifier (SSID), and that may provide security for access points 210.

Moreover, access points 210 may have different concurrent links 216 in different bands of frequencies (such as a link 216-1 with a link identifier 1 in a 2.4 GHz band of frequencies, a link 216-2 with a link identifier 2 in a 5 GHz band of frequencies and a link 216-3 with a link identifier 3 in a 6 GHz bands of frequencies) with stations 218 in at least electronic device 110-1, which is a non-AP MLD. These stations may have associated lower MAC and PHY layers (including separate radios, which may be included in the same or different integrated circuits). In addition, electronic device 110-1 may have an ML entity 220 having an MLD MAC address.

For example, the AP MLD may have three radios. One radio may operate on a 2.4 GHz band of frequencies, and the other radios may operate on the 5/6 GHz bands of frequencies. The AP MLD may create three access points 210, operating on a 2.4 GHz channel, a 5 GHz channel, and a 6 GHz channel respectively. The three access points 210 may operate independently, each of which has at least one BSS with different BSSIDs 212. (While FIG. 2 illustrates the AP MLD with three access points 210, more generally the AP MLD may include up to 15 access points with one or more access points in a given band of frequencies.) Moreover, each of the access points 210 may accommodate both legacy non-access point stations as well as non-AP MLD stations 218. Furthermore, each of access points 210 may transmit its own beacon frames using its own BSSID. Additionally, the AP MLD may have ML entity 214, identified by an MLD address (such as an MLD MAC address). This MAC address may be used to pair with ML entity 220 of the associated non-AP MLD stations 218.

Moreover, the non-AP MLD station (e.g., electronic device 110-1) may have two or three radios. One radio may operate on a 2.4 GHz band of frequencies, and the other radios may operate on the 5/6 GHz bands of frequencies. When the non-AP MLD establishes a ML association with the AP MLD, it may create up to three stations 218, each of which associates to one of access points 210 within the AP MLD. Each of stations 218 may have a different over-the-air MAC address 222. The non-AP MLD may also have ML entity 220, identified by another MLD address (such as another MLD MAC address). This MLD MAC address may be used to pair with ML entity 214 of the associated AP MLD.

However, the use of multiple links 216 raises challenges with link discovery and setup or configuration. In order to address these challenges, as described below with reference to FIGS. 3-6, in some embodiments of the disclosed communication techniques an access point (such as access point 210-1) may provide or transmit, in a band of frequencies, a beacon frame that includes information (e.g., in an RNR or an ML element) associated with operation of a third electronic device (such as access point 210-2 or 210-3) in a second band of frequencies. This beacon or group-addressed frame may be received by a second electronic device (such as electronic device 110-1, e.g., station 218-1) while the second electronic device is performing a scan of the band of frequencies, e.g., using a data radio that transmits and/or receives frames or a scanning radio that only receives frames. Moreover, the second electronic device may optionally perform a second scan of the second band of frequencies (e.g., using a second data radio that transmits and/or receives frames or the scanning radio that only receives frames) based at least in part on the information. Note that the second scan may be performed, at least in part, while the scan is performed. Using the information, the second electronic device may associate with (or establish a connection with) the third electronic device, e.g., while the second scan is performed or after the scan and the second scan are completed.

Moreover, as described below with reference to FIGS. 7 and 8, in some embodiments of the disclosed communication techniques an electronic device (such as electronic device 110-1, e.g., station 218-1) may communicate, using a data radio, frames in a band of frequencies that are associated with a second electronic device (such as access point 210-1), where the data radio transmits and/or receives the frames. Then, the electronic device may interrupt the communication of the frames and may perform, using a second data radio, a scan of a second band of frequencies, where the second data radio transmits and/or receives second frames. Moreover, the electronic device may receive, using the second data radio, a beacon frame associated with a third electronic device (such as access point 210-2 or 210-3) in the second band of frequencies. Note that the frames may include a frame (such as a group-address frame) that includes information (e.g., in an RNR or an ML element) associated with operation of the third electronic device in the second band of frequencies and the scan is based at least in part on the information. Next, after the beacon frame is received, the electronic device may resume communication of third frames in the band of frequencies using the data radio.

Alternatively, as described below with reference to FIGS. 9 and 10, instead of interrupting the communication and performing the scan of the second band of frequencies and receiving the beacon frame using the second data radio, the electronic device may perform, using a scanning radio that only receives second frames, the scan of the second band of frequencies while the frames are communicated and may receive the beacon frame associated with the third electronic device.

Furthermore, as described below with reference to FIGS. 11-13, in some embodiments of the disclosed communication techniques an electronic device (such as access point 210-1) may transmit a beacon or a group-addressed frame in a band of frequencies, where the beacon frame includes information specifying a beacon frame type and/or a beacon MCS, and where the group-addressed frame includes second information specifying a group-addressed-frame type and/or a group-addressed frame MCS. Additionally, the electronic device (such as access point 210-2) may transmit a second beacon or a second group-addressed frame in the second band of frequencies, where the second beacon frame includes third information specifying a second beacon frame type and/or a second beacon MCS, where the second group-addressed frame includes third information specifying a second group-addressed-frame type and/or a second group-addressed frame MCS, and where one of: the second beacon frame type is different from the beacon frame type; the second beacon MCS is different from the beacon MCS; the second group-addressed-frame type is different from the group-addressed-frame type; or the second group-addressed-frame MCS is different from the group-addressed-frame MCS. Then, the second electronic device (such as electronic device 110-1, e.g., station 218-1 or 218-2) may receive the beacon frame, the group-addressed frame, the second beacon frame or the second group-addressed frame, e.g., using a data radio that transmits and/or receives frames. Note that the information may include the beacon bandwidth and the second information may include the group-addressed-frame bandwidth.

As described below with reference to FIGS. 14-16, in some embodiments of the disclosed communication techniques an electronic device (such as access point 210-1, 210-2 or 210-3) may transmit, addressed to a second electronic device (such as electronic device 110-1, e.g., station 218-1, 218-2 or 218-3), a frame including a TPC report, where TPC report includes a transmit power used by the electronic device for all frames in a 6 GHz band of frequencies. Then, the second electronic device may receive the frame.

Moreover, as described below with reference to FIGS. 17-19, in some embodiments of the disclosed communication techniques an electronic device (such as access point 210-1, 210-2 or 210-3) may transmit, addressed to a second electronic device (such as electronic device 110-1, e.g., station 218-1, 218-2 or 218-3), a beacon frame including a critical capability update flag and an RNR, where the RNR includes a change sequence number, and where the critical capability update flag and the RNR indicate an update to one of: a transmit power of the electronic device, a beacon frame type of the electronic device, or a group-addressed frame type of the electronic device. Then, the second electronic device may receive the beacon frame.

Furthermore, as described below with reference to FIGS. 20-22, in some embodiments of the disclosed communication techniques an electronic device (such as access point 210-1, 210-2 or 210-3) may transmit a frame that indicates the electronic device (such as electronic device 110-1, e.g., station 218-1, 218-2 or 218-3) supports requests regarding beacon or group-addressed-frame transmission mode. Then, the electronic device may receive, associated with a second electronic device, a request for information about the beacon or group-addressed-frame transmission mode. Next, the electronic device may transmit, addressed to the second electronic device, a response with information specifying the beacon or group-addressed frame transmission mode. For example, the request may specify a proposed beacon or group-addressed transmission mode, and the response may indicate acceptance of the proposed beacon or group-addressed transmission mode, or may specify a second proposed beacon or group-addressed transmission mode.

In summary, the communication techniques may be used to facilitate the discovery of out-of-band electronic devices, electronic-device setup and/or configuration. These capabilities may improve the efficiency of spectrum usage and/or the communication performance when communicating in a WLAN using electronic devices, such as an access point 112, electronic device 110-1, and/or legacy electronic devices.

Referring back to FIG. 1, note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as Orthogonal Frequency Division Multiple Access or OFDMA). For example, the one or more radios 114-2 may provide one or more trigger frames for the one or more electronic devices. Moreover, in response to receiving the one or more trigger frames, the one or more radios 114-1 may provide one or more group or block acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques.

Figure 3:
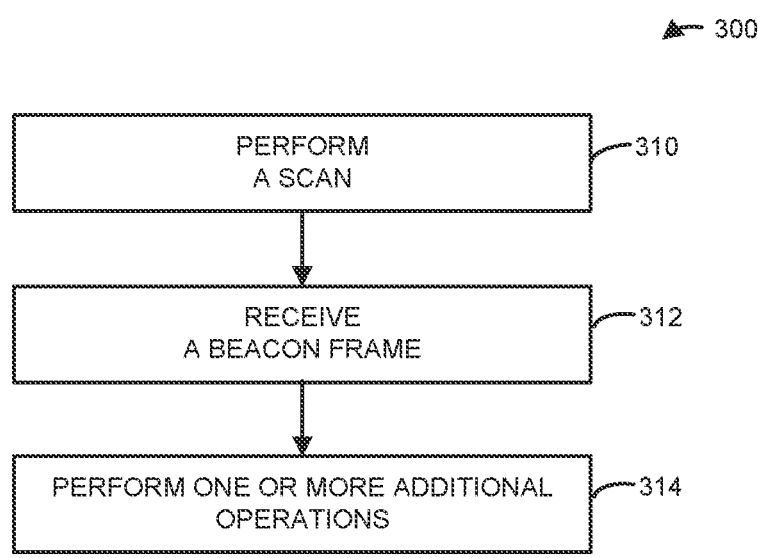
FIG. 3 is a flow diagram illustrating an example method for performing a scan using an electronic device of FIG. 1 or 2.

FIG. 3 presents a flow diagram illustrating an example method 300 for performing a scan. This method may be performed by an electronic device, such as electronic device 110-1 in FIG. 1. Note that the communication with a second electronic device may be compatible with an IEEE 802.11 communication protocol.

During operation, a data radio in the electronic device may perform the scan (operation 310) of a band of frequencies, where the data radio transmits and/or receives frames. Moreover, the data radio may receive a beacon frame (operation 312) associated with a second electronic device, where the beacon frame includes information associated with operation of a third electronic device in a second band of frequencies.

Note that the electronic device may not be associated with (or may not have a connection with) the second electronic device and/or the third electronic device. Moreover, the second electronic device and the third electronic device may include access points that are co-hosted or co-located in, or affiliated with, an AP MLD. Furthermore, the beacon frame may include an RNR and the RNR may include the information. Additionally, the beacon frame may include a ML element and the ML may include the information. In some embodiments, the information may include: a primary channel of the third electronic device, a bandwidth of the beacon frame, and/or an indication of whether the third electronic device can receive an 80 MHz wide non-high-throughput duplicate PPDU.

In some embodiments, the electronic device optionally performs one or more additional operations (operation 314). For example, the electronic device may include a second data radio and a scanning radio. The second data radio may transmit and/or receive second frames and the scanning radio may only receive third frames. Moreover, the electronic device may perform a second scan of the second band of frequencies using the second data radio or the scanning radio based at least in part on the information. Note that the second scan may be performed, at least in part, while the scan is performed. Furthermore, the electronic device may associate with the second electronic device while the second scan is performed.

Figure 4:
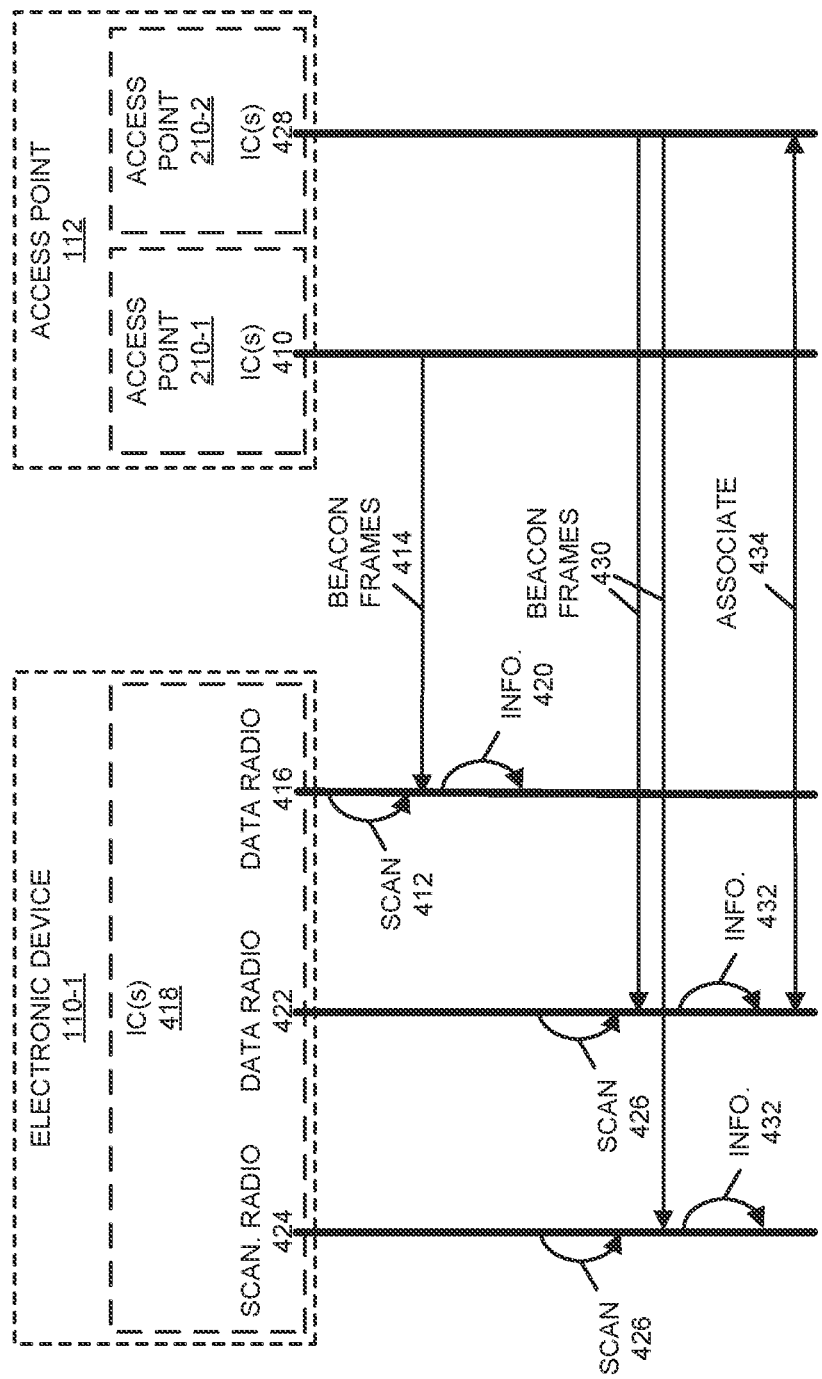
FIG. 4 is a drawing illustrating an example of communication between the electronic devices of FIG. 1 or 2.

The communication techniques are further illustrated in FIG. 4, which presents a flow diagram illustrating an example of communication between electronic device 110-1 and access point 112. During operation, one or more interface circuits (ICs) 410 in access point 210-1 may transmit one or more beacon frames 414, where access point 210-1 is included in an AP MLD (in access point 112) with access point 210-2. The one or more beacon frames 414 may be received by a data radio 416 in one or more interface circuits 418 in electronic device 110-1 that is performing a scan 412 of a band of frequencies. Note that the one or more beacon frames 414 may include information 420 associated with operation of access point 210-2 in a second band of frequencies.

Based at least in part on information 420, a data radio 422 or a scanning radio 424 in the one or more interface circuits 418 may perform a scan 426 in the second band of frequencies. Note that scan 426 may be performed, at least in part, while scan 412 is performed. Furthermore, one or more interface circuits 428 in access point 210-2 may transmit one or more beacon frames 430 with information 432 associated with operation of access point 210-2 in the second band of frequencies. Then, the one or more beacon frames 430 may be received by data radio 422 or scanning radio 424. Next, based at least in part on information 432, data radio 422 may associate 434 with access point 210-2 while scan 426 is performed.

Figure 5:
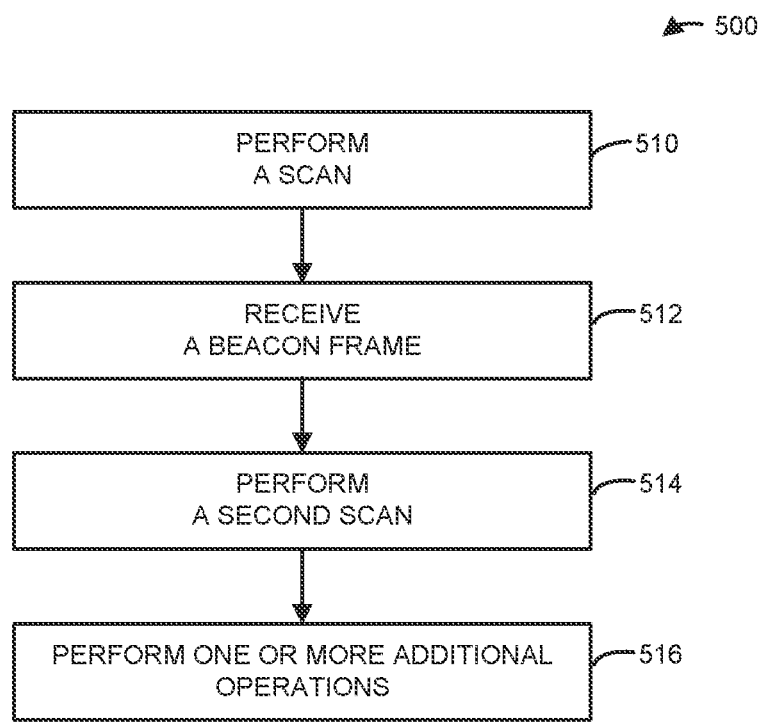
FIG. 5 is a flow diagram illustrating an example method for performing a scan using an electronic device of FIG. 1 or 2.

FIG. 5 presents a flow diagram illustrating an example method 500 for performing a scan. This method may be performed by an electronic device, such as electronic device 110-1 in FIG. 1. Note that the communication with a second electronic device may be compatible with an IEEE 802.11 communication protocol.

During operation, a scanning radio in the electronic device may perform the scan (operation 510) of a band of frequencies, where the scanning radio only receives frames. Then, the scanning radio may receive a beacon frame (operation 512) associated with a second electronic device, where the beacon frame includes information associated with operation of a third electronic device in a second band of frequencies. Next, a data radio in the electronic device may perform a second scan (operation 514) of the second band of frequencies based at least in part on the information, where the data radio transmits and/or receives second frames, and where the second scan is performed, at least in part, while the scan is performed.

Note that the electronic device may not be associated with (or may not have a connection with) the second electronic device and/or the third electronic device. Moreover, the second electronic device and the third electronic device may include access points that are co-hosted or co-located in, or affiliated with, an AP MLD. Furthermore, the beacon frame may include an RNR and the RNR may include the information. Additionally, the beacon frame may include an ML element and the ML may include the information. In some embodiments, the information may include: a primary channel of the third electronic device, a bandwidth of the beacon frame, and/or an indication of whether the third electronic device can receive an 80 MHz wide non-high-throughput duplicate PPDU.

In some embodiments, the electronic device optionally performs one or more additional operations (operation 516). For example, the electronic device may associate with (or establish a connection with) the third electronic device after the scan and the second scan are completed.

Figure 6:
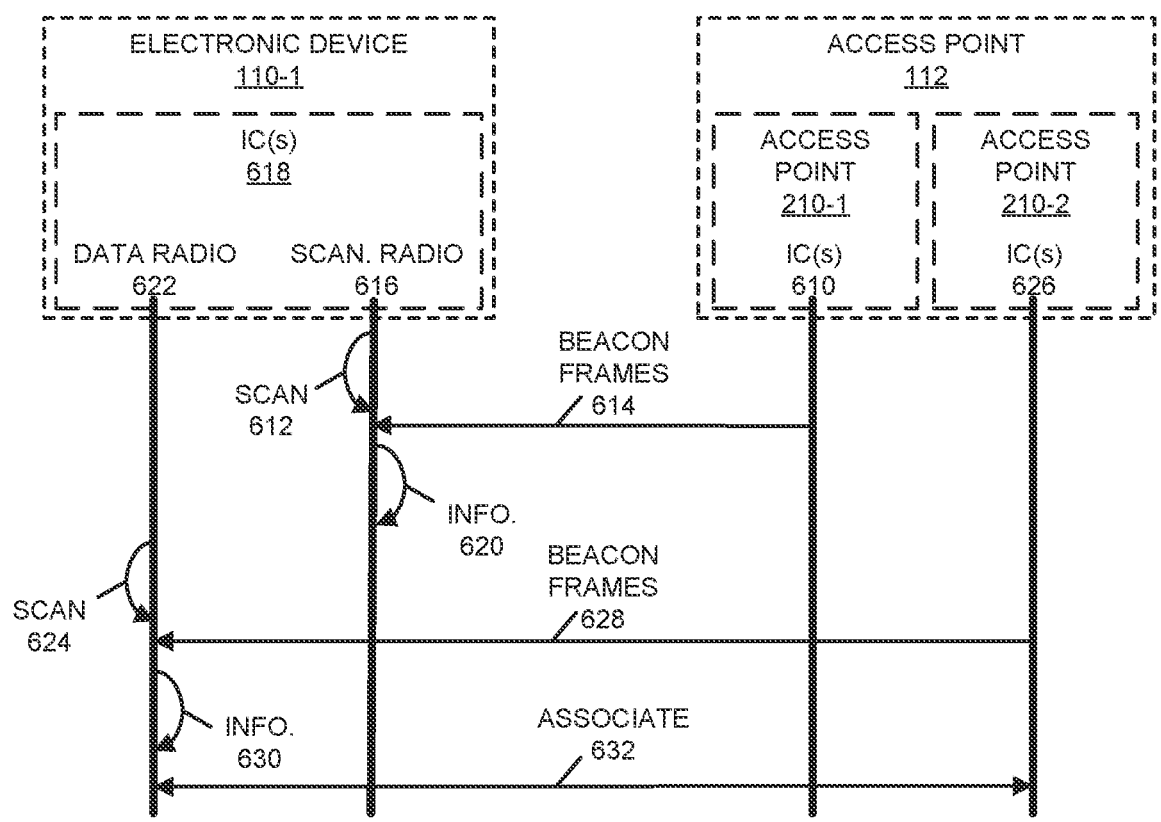
FIG. 6 is a drawing illustrating an example of communication between the electronic devices of FIG. 1 or 2.

The communication techniques are further illustrated in FIG. 6, which presents a flow diagram illustrating an example of communication between electronic device 110-1 and access point 112. During operation, one or more interface circuits 610 in access point 210-1 may transmit one or more beacon frames 614, where access point 210-1 is included in an AP MLD (in access point 112) with access point 210-2. The one or more beacon frames 614 may be received by a scanning radio 616 in one or more interface circuits 618 in electronic device 110-1 that is performing a scan 612 of a band of frequencies. Note that the one or more beacon frames 614 may include information 620 associated with operation of access point 210-2 in a second band of frequencies.

Based at least in part on information 620, a data radio 622 in the one or more interface circuits 618 may perform a scan 624 in the second band of frequencies. Note that scan 624 may be performed, at least in part, while scan 612 is performed. Furthermore, one or more interface circuits 626 in access point 210-2 may transmit one or more beacon frames 628 with information 630 associated with operation of access point 210-2 in the second band of frequencies. Then, the one or more beacon frames 628 may be received by data radio 622. Next, based at least in part on information 630, data radio 622 may associate 632 with access point 210-2 after scan 612 and scan 624 are completed.

Figure 7:
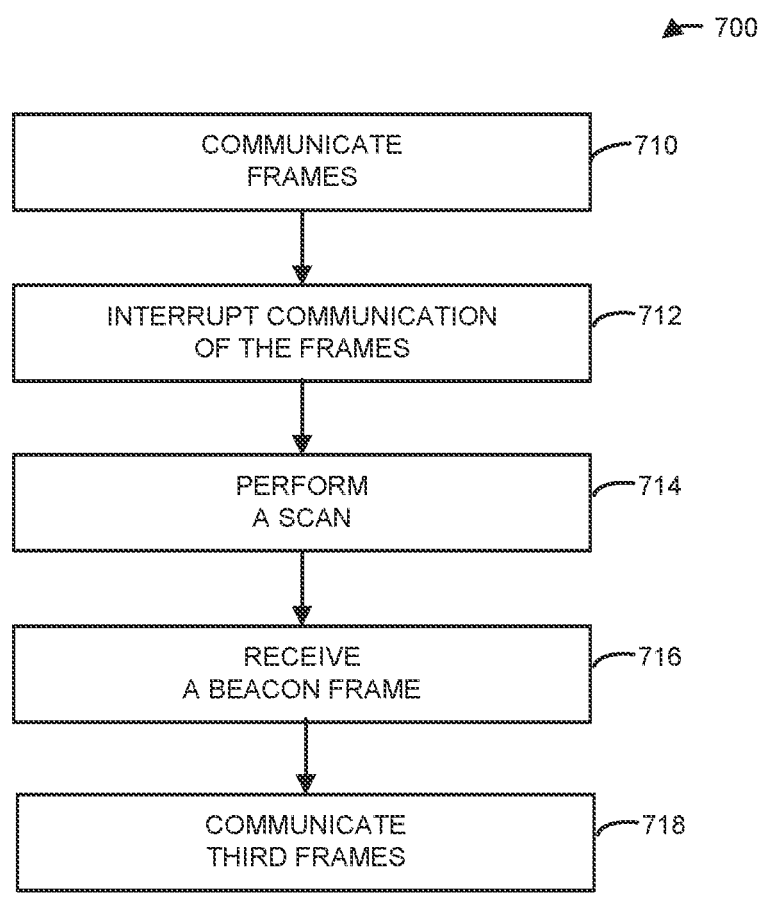
FIG. 7 is a flow diagram illustrating an example method for performing a scan using an electronic device of FIG. 1 or 2.

FIG. 7 presents a flow diagram illustrating an example method 700 for performing a scan. This method may be performed by an electronic device, such as electronic device 110-1 in FIG. 1. Note that the communication with a second electronic device may be compatible with an IEEE 802.11 communication protocol.

During operation, a data radio in the electronic device may communicate frames (operation 710) in a band of frequencies that are associated with a second electronic device, where the data radio transmits and/or receives the frames. Then, the electronic device may interrupt the communication of the frames (operation 712) and may perform, using a second data radio in the electronic device, the scan (operation 714) of a second band of frequencies, where the second data radio transmits and/or receives second frames. Moreover, the second data radio may receive a beacon frame (operation 716) associated with a third electronic device in the second band of frequencies. Next, after the beacon frame is received (operation 716), the electronic device may resume communication of third frames (operation 718) in the band of frequencies using the data radio.

Note that the electronic device may be associated with (or may have a connection with) the second electronic device. Moreover, the second electronic device and the third electronic device may include access points that are co-hosted or co-located in, or affiliated with, an AP MLD. Furthermore, the frames may include a frame that includes information associated with operation of the third electronic device in the second band of frequencies and the scan is based at least in part on the information. Additionally, the frame may include a group-addressed frame. In some embodiments, the frame may include an RNR and the RNR may include the information. Alternatively or additionally, the frame may include an ML element and the ML may include the information. Note that the information may include: a primary channel of the third electronic device, a bandwidth of the beacon frame, and/or an indication of whether the third electronic device can receive an 80 MHz wide non-high-throughput duplicate PPDU.

Figure 8:
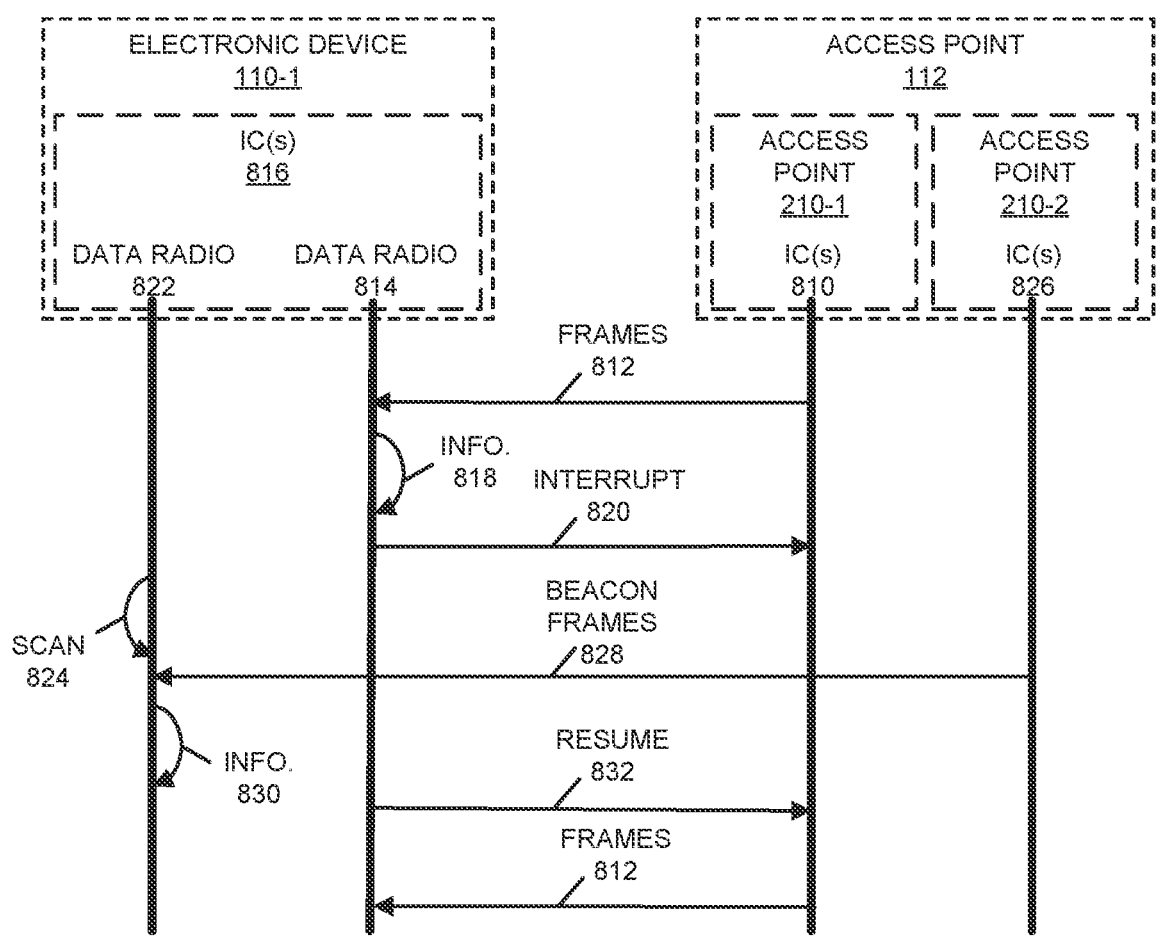
FIG. 8 is a drawing illustrating an example of communication between the electronic devices of FIG. 1 or 2.

The communication techniques are further illustrated in FIG. 8, which presents a flow diagram illustrating an example of communication between electronic device 110-1 and access point 112. During operation, one or more interface circuits 810 in access point 210-1 may transmit one or more frames 812, where access point 210-1 is included in an AP MLD (in access point 112) with access point 210-2. These frames may be received by a data radio 814 in one or more interface circuits 816 in electronic device 110-1, where frames 812 are communicated in a band of frequencies. Note that at least one of frames 812 includes information 818 associated with operation of access point 210-2 in a second band of frequencies, where access point 210-2 is included in an AP MLD with access point 210-1.

Then, data radio 814 may interrupt 820 the communication of frames 812 and data radio 822 in the one or more interface circuit 816 may perform a scan 824 of the second band of frequencies. Moreover, one or more interface circuits 826 in access point 210-2 may transmit one or more beacon frames 828. The one or more beacon frames 828 may be received by data radio 822. Note that the one or more beacon frames 828 may include information 830 associated with operation of access point 210-2 in the second band of frequencies.

Next, data radio 814 may resume 832 communication frames 834 in the band of frequencies.

Figure 9:
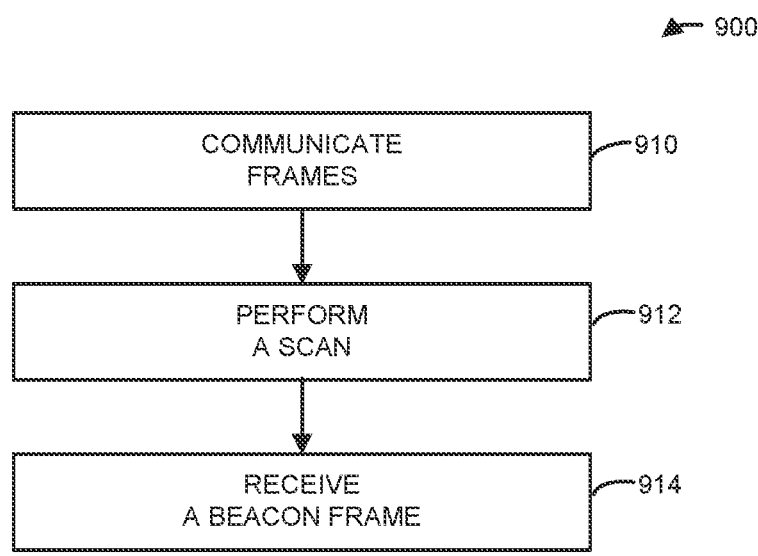
FIG. 9 is a flow diagram illustrating an example method for performing a scan using an electronic device of FIG. 1 or 2.

FIG. 9 presents a flow diagram illustrating an example method 900 for performing a scan. This method may be performed by an electronic device, such as electronic device 110-1 in FIG. 1. Note that the communication with a second electronic device may be compatible with an IEEE 802.11 communication protocol.

During operation, a data radio in the electronic device may communicate frames (operation 910) in a band of frequencies that are associated with a second electronic device, where the data radio is configured to transmit and/or receive the frames. Then, a scanning radio in the electronic device may perform the scan (operation 912) of a second band of frequencies, where the scanning radio only receives second frames and the scan is performed when the frames are communicated. Next, the scanning radio may receive a beacon frame (operation 914) associated with a third electronic device in the second band of frequencies.

Note that the electronic device may be associated with (or may have a connection with) the second electronic device. Moreover, the second electronic device and the third electronic device may include access points that are co-hosted or co-located in, or affiliated with, an AP MLD. Furthermore, the frames may include a frame that includes information associated with operation of the third electronic device in the second band of frequencies and the scan is based at least in part on the information. Additionally, the frame may include a group-addressed frame. In some embodiments, the frame may include an RNR and the RNR may include the information. Alternatively or additionally, the frame may include an ML element and the ML may include the information. Note that the information may include: a primary channel of the third electronic device, a bandwidth of the beacon frame, and/or whether the third electronic device receives an 80 MHz wide non-high-throughput duplicate PPDU.

Figure 10:
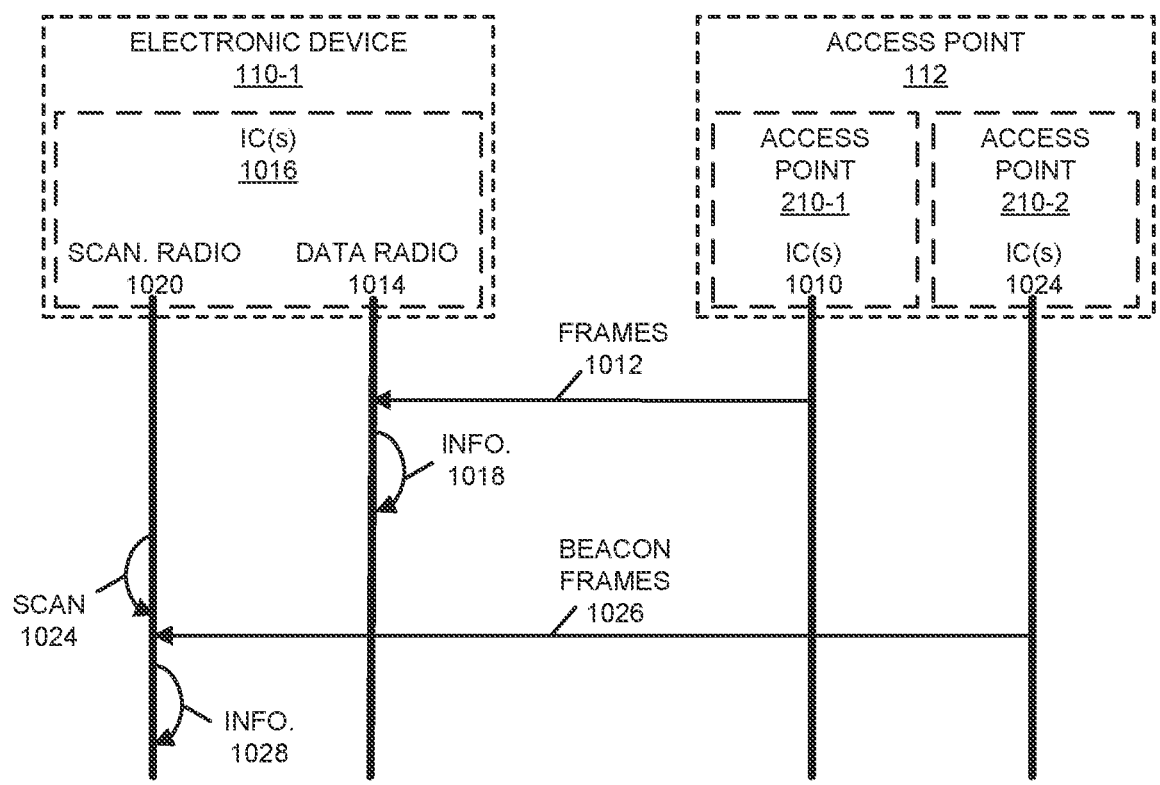
FIG. 10 is a drawing illustrating an example of communication between the electronic devices of FIG. 1 or 2.

The communication techniques are further illustrated in FIG. 10, which presents a flow diagram illustrating an example of communication between electronic device 110-1 and access point 112. During operation, one or more interface circuits 1010 in access point 210-1 may transmit frames 1012, where access point 210-1 is included in an AP MLD (in access point 112) with access point 210-2. These frames may be received by a data radio 1014 in one or more interface circuits 1016 in electronic device 110-1, where frames 1012 are communicated in a band of frequencies. Note that at least one of frames 1012 includes information 1018 associated with operation of access point 210-2 in a second band of frequencies, where access point 210-2 is included in an AP MLD with access point 210-1.

Then, a scanning radio 1020 in the one or more interface circuit 1016 may perform a scan 1022 of the second band of frequencies while frames 1012 are communicated. Moreover, one or more interface circuits 1024 in access point 210-2 may transmit one or more beacon frames 1026. The one or more beacon frames 1026 may be received by scanning radio 1020. Note that the one or more beacon frames 1026 may include information 1028 associated with operation of access point 210-2 in the second band of frequencies.

Figure 11:
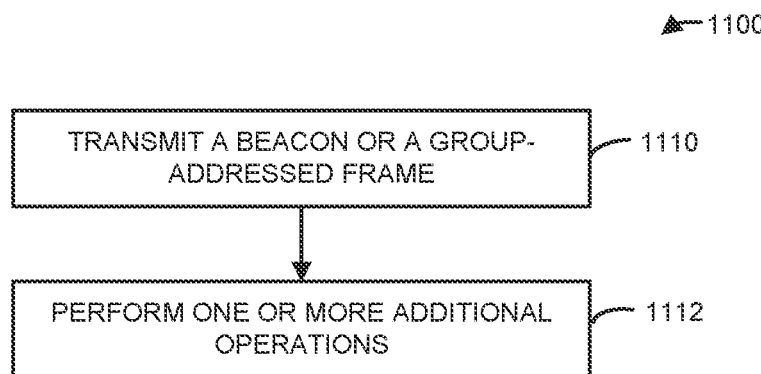
FIG. 11 is a flow diagram illustrating an example method for transmitting a beacon or a group-addressed frame using an electronic device of FIG. 1 or 2.

FIG. 11 presents a flow diagram illustrating an example method 1100 for transmitting a beacon or a group-addressed frame. This method may be performed by an electronic device, such as access point 112 in FIG. 1.

During operation, the electronic device may transmit the beacon or the group-addressed frame (operation 1110) in a band of frequencies, where the beacon frame includes information specifying a beacon frame type and/or a beacon MCS, and where the group-addressed frame includes second information specifying a group-addressed-frame type and/or a group-addressed frame MCS.

Note that the electronic device may include an access point. Moreover, the information may include the beacon bandwidth and the second information may include the group-addressed-frame bandwidth.

In some embodiments, the electronic device optionally performs one or more additional operations (operation 1112). For example, the electronic device may be associated with an access point co-hosted or co-located in, or affiliated with, an AP MLD with a second access point in a second band of frequencies. Furthermore, the electronic device may transmit a second beacon or a second group-addressed frame in the second band of frequencies, where the second beacon frame includes third information specifying a second beacon frame type and/or a second beacon MCS, where the second group-addressed frame includes third information specifying a second group-addressed-frame type and/or a second group-addressed frame MCS, and where one of: the second beacon frame type is different from the beacon frame type; the second beacon MCS is different from the beacon MCS; the second group-addressed-frame type is different from the group-addressed-frame type; or the second group-addressed-frame MCS is different from the group-addressed-frame MCS.

Figure 12:
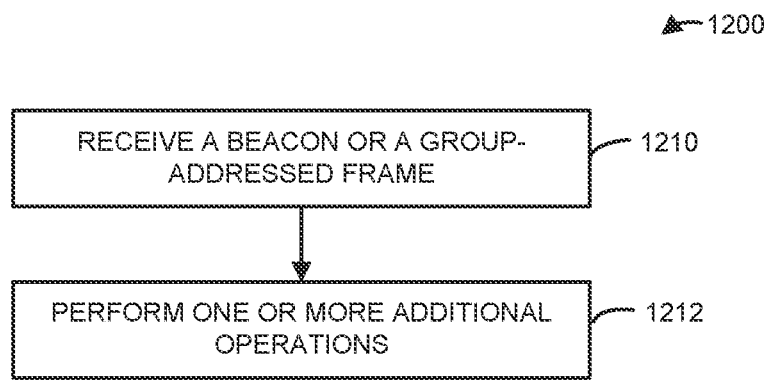
FIG. 12 is a flow diagram illustrating an example method for receiving a beacon or a group-addressed frame using an electronic device of FIG. 1 or 2.

FIG. 12 presents a flow diagram illustrating an example method 1200 for receiving a beacon or a group-addressed frame. This method may be performed by a second electronic device, such as electronic device 110-1 in FIG. 1.

During operation, the second electronic device may receive the beacon or the group-addressed frame (operation 1210) in a band of frequencies, where the beacon frame includes information specifying a beacon frame type and/or a beacon MCS, and where the group-addressed frame includes second information specifying a group-addressed-frame type and/or a group-addressed frame MCS. Note that the second electronic device may receive the group-addressed frame using a data radio based at least in part on the second information, where the data radio transmits and/or receives frames.

In some embodiments, the second electronic device optionally performs one or more additional operations (operation 1212). For example, the second electronic device may receive a second beacon or a second group-addressed frame in a second band of frequencies, where the second beacon frame includes third information specifying a second beacon frame type and/or a second beacon MCS, where the second group-addressed frame includes third information specifying a second group-addressed-frame type and/or a second group-addressed frame MCS, and where one of: the second beacon frame type is different from the beacon frame type; the second beacon MCS is different from the beacon MCS; the second group-addressed-frame type is different from the group-addressed-frame type; or the second group-addressed-frame MCS is different from the group-addressed-frame MCS.

Figure 13:
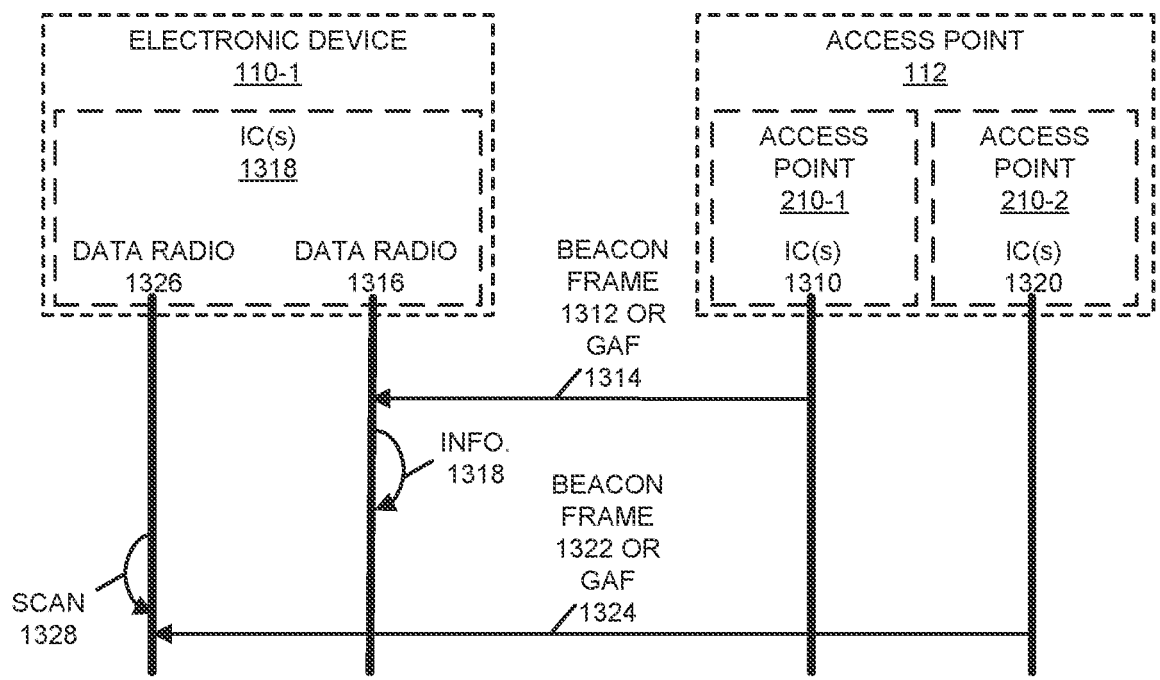
FIG. 13 is a drawing illustrating an example of communication between the electronic devices of FIG. 1 or 2.

The communication techniques are further illustrated in FIG. 13, which presents a flow diagram illustrating an example of communication between electronic device 110-1 and access point 112. During operation, one of one or more interface circuits 1310 in access point 210-1 may transmit a beacon frame 1312 or a group-addressed frame (GAF) 1314 in a band of frequencies, where access point 210-1 is included in an AP MLD (in access point 112) with access point 210-2. The beacon or group-address frame may be received by a data radio 1316 in one or more interface circuits 1318 in electronic device 110-1.

Moreover, one or more interface circuits 1320 in access point 210-2 may transmit a beacon frame 1322 or a group-addressed frame 1324 in a second band of frequencies. This beacon or group-address frame may be received by a data radio 1326 in the one or more interface circuits 1318 in electronic device 110-1. For example, beacon frame 1322 may be received when data radio 1326 performs a scan 1328.

Figure 14:
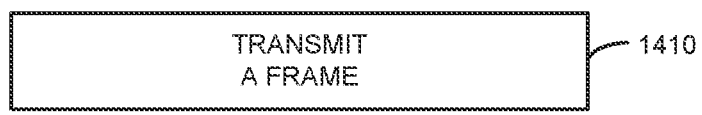
FIG. 14 is a flow diagram illustrating an example method for transmitting a frame using an electronic device of FIG. 1 or 2.

FIG. 14 presents a flow diagram illustrating an example method 1400 for transmitting a frame. This method may be performed by an electronic device, such as access point 112 in FIG. 1. Note that the communication with a second electronic device may be compatible with an IEEE 802.11 communication protocol.

During operation, the electronic device may transmit, addressed to the second electronic device, the frame (operation 1410) including a TPC report, where the TPC report includes a transmit power used by the electronic device for all frames in a 6 GHz band of frequencies.

Note that the electronic device may include an access point. Moreover, the electronic device may be associated with an access point co-hosted or co-located in, or affiliated with, an AP MLD.

Figure 15:
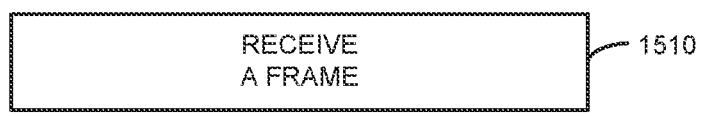
FIG. 15 is a flow diagram illustrating an example method for receiving a frame using an electronic device of FIG. 1 or 2.

FIG. 15 presents a flow diagram illustrating an example method 1500 for receiving a frame. This method may be performed by a second electronic device, such as electronic device 110-1 in FIG. 1. Note that the communication with the electronic device may be compatible with an IEEE 802.11 communication protocol.

During operation, the second electronic device may receive, associated with the electronic device, the frame (operation 1510) including a TPC report, where the TPC report includes a transmit power used by the electronic device for all frames in a 6 GHz band of frequencies.

Figure 16:
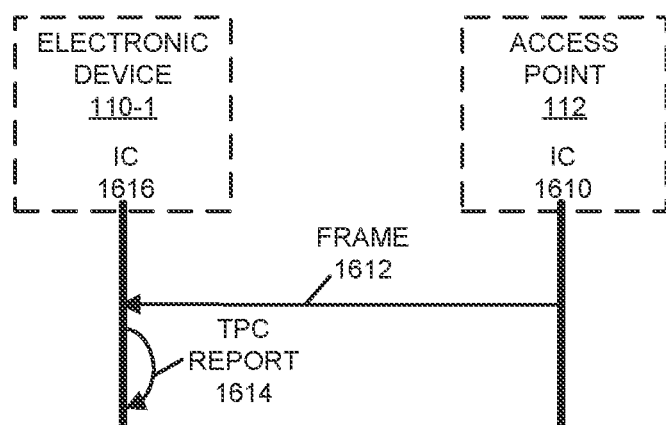
FIG. 16 is a drawing illustrating an example of communication between the electronic devices of FIG. 1 or 2.

The communication techniques are further illustrated in FIG. 16, which presents a flow diagram illustrating an example of communication between electronic device 110-1 and access point 112. During operation, an interface circuit 1610 in access point 112 may transmit a frame 1612, where frame 1612 includes a TPC report 1614. This frame may be received by an interface circuit 1616 in electronic device 110-1.

Figure 17:
FIG. 17 is a flow diagram illustrating an example method for transmitting a beacon frame using an electronic device of FIG. 1 or 2.

FIG. 17 presents a flow diagram illustrating an example method 1700 for transmitting a beacon frame. This method may be performed by an electronic device, such as access point 112 in FIG. 1.

During operation, the electronic device may transmit a beacon frame (operation 1710) including a critical capability update flag and an RNR, where the RNR includes a change sequence number, and where the critical capability update flag and the RNR indicate an update to one of: a transmit power of the electronic device, a beacon frame type of the electronic device, or a group-addressed frame type of the electronic device.

Note that the electronic device may include an access point. Moreover, the electronic device may be associated with an access point co-hosted or co-located in, or affiliated with, an AP MLD.

Figure 18:
FIG. 18 is a flow diagram illustrating an example method for receiving a beacon frame using an electronic device of FIG. 1 or 2.

FIG. 18 presents a flow diagram illustrating an example method 1800 for receiving a beacon frame. This method may be performed by a second electronic device, such as electronic device 110-1 in FIG. 1.

During operation, the second electronic device may receive a beacon frame (operation 1810) including a critical capability update flag and an RNR, where the RNR includes a change sequence number, and where the critical capability update flag and the RNR indicate an update to one of: a transmit power of the electronic device, a beacon frame type of the electronic device, or a group-addressed frame type of the electronic device.

Figure 19:
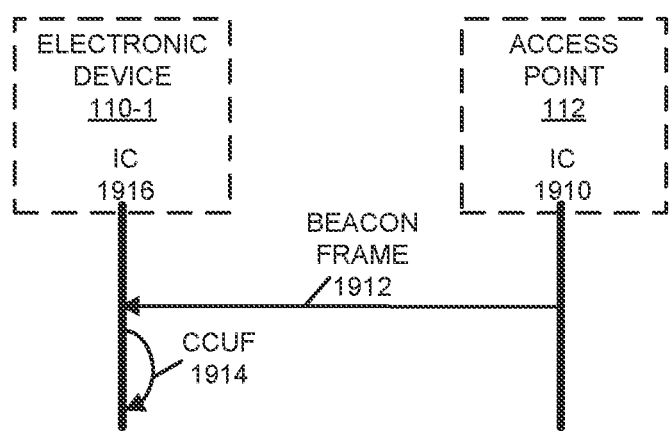
FIG. 19 is a drawing illustrating an example of communication between the electronic devices of FIG. 1 or 2.

The communication techniques are further illustrated in FIG. 19, which presents a flow diagram illustrating an example of communication between electronic device 110-1 and access point 112. During operation, an interface circuit 1910 in access point 112 may transmit a beacon frame 1912, where beacon frame 1912 includes a critical capability update flag (CCUF) 1914. This beacon frame may be received by an interface circuit 1916 in electronic device 110-1.

Figure 20:
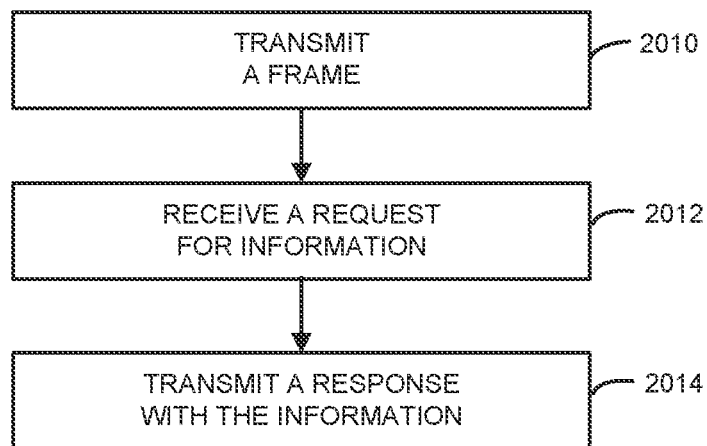
FIG. 20 is a flow diagram illustrating an example method for transmitting a frame using an electronic device of FIG. 1 or 2.

FIG. 20 presents a flow diagram illustrating an example method 2000 for transmitting a frame. This method may be performed by an electronic device, such as access point 112 in FIG. 1. Note that the communication with a second electronic device may be compatible with an IEEE 802.11 communication protocol.

During operation, the electronic device may transmit the frame (operation 2010) that indicates the electronic device supports requests regarding beacon or group-addressed-frame transmission mode. Then, the electronic device may receive, associated with a second electronic device, a request for information (operation 2012) about the beacon or group-addressed-frame transmission mode. Next, the electronic device may transmit, addressed to the second electronic device, a response with the information (operation 2014) specifying the beacon or group-addressed frame transmission mode.

Moreover, the interface circuit may be associated with an access point co-hosted or co-located in, or affiliated with, an AP MLD. Furthermore, the second electronic device may include a station in a non-AP MLD. Additionally, the request may specify a proposed beacon or group-addressed transmission mode. In some embodiments, the response may indicate acceptance of the proposed beacon or group-addressed transmission mode, or may specify a second proposed beacon or group-addressed transmission mode.

Figure 21:
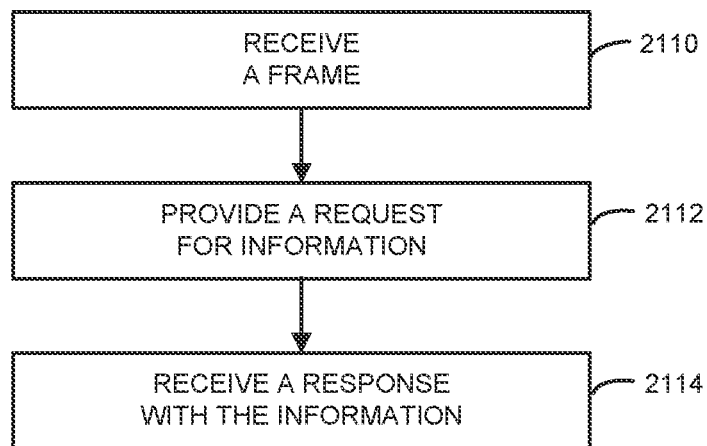
FIG. 21 is a flow diagram illustrating an example method for receiving a frame using an electronic device of FIG. 1 or 2.

FIG. 21 presents a flow diagram illustrating an example method 2100 for receiving a frame. This method may be performed by a second electronic device, such as electronic device 110-1 in FIG. 1. Note that the communication with the electronic device may be compatible with an IEEE 802.11 communication protocol.

During operation, the second electronic device may receive the frame (operation 2110) that indicates the electronic device supports requests regarding beacon or group-addressed-frame transmission mode. Then, the second electronic device may provide, addressed to the electronic device, a request for information (operation 2112) about the beacon or group-addressed-frame transmission mode. Next, the second electronic device may receive, associated with the electronic device, a response with the information (operation 2114) specifying the beacon or group-addressed frame transmission mode.

In some embodiments of methods 300 (FIG. 3), 5 (FIG. 5), 7 (FIG. 7), 9 (FIG. 9), 11 (FIG. 11), 12 (FIG. 12), 14 (FIG. 14), 15 (FIG. 15), 17 (FIG. 17), 18 (FIG. 18), 20 (FIG. 20) and/or 21, there may be additional or fewer operations. Further, one or more different operations may be included. Moreover, the order of the operations may be changed, and/or two or more operations may be combined into a single operation or performed at least partially in parallel.

Figure 22:
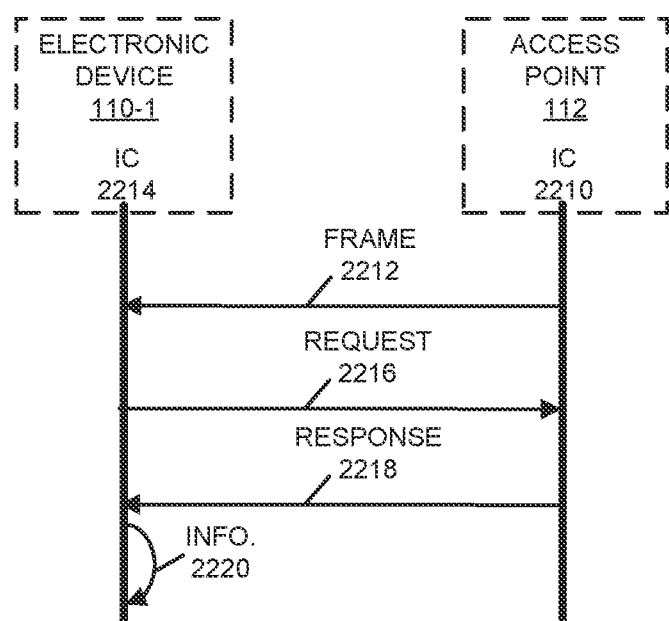
FIG. 22 is a drawing illustrating an example of communication between the electronic devices of FIG. 1 or 2.

The communication techniques are further illustrated in FIG. 22, which presents a flow diagram illustrating an example of communication between electronic device 110-1 and access point 112. During operation, an interface circuit 2210 in access point 112 may transmit a frame 2212, where frame 2212 indicates access point 112 supports requests regarding beacon or group-addressed-frame transmission mode. This frame may be received by an interface circuit 2214 in electronic device 110-1.

Then, interface circuit 2214 may provide, addressed to access point 112, a request 2216 for information 2220 about the beacon or group-addressed-frame transmission mode. After receiving request 2216, interface circuit 2210 may provide a response 2218 with information 2220, which may be received by interface circuit 2214.

While communication between the components in FIGS. 4, 6, 8, 10, 13, 16, 19 and 22 are illustrated with unilateral or bilateral communication (e.g., lines having a single arrow or dual arrows), in general a given communication operation may be unilateral or bilateral.

In some embodiments, the communication techniques facilitate the use of multiple bands of frequencies, e.g., with an AP MLD, a non-AP MLD or a legacy station. Discovery operations (e.g., of an access point) often vary in different bands of frequencies (such as 2.4 and 5 GHz versus 6 GHz), and may include in-band active scanning (e.g., a probe request and a probe response), in-band passive scanning (e.g., using beacons or unsolicited frames), and/or out-of-band (OoB) discovery (e.g., a probe request and a probe response in a different band of frequencies).

For example, there are fewer 20 MHz channels in the 2.4 GHz band of frequencies than the number of channels in the 5 GHz band of frequencies and/or the 6 GHz band of frequencies. Moreover, these channels often have better coverage. Consequently, a WLAN may include OoB discovery mechanisms to signal access-point information in another band of frequencies and/or using a different channel. For example, a non-access-point station or client (which is sometimes referred to as a 'receiving electronic device') may start scanning from the 2.4 GHz band of frequencies to discovery in-band legacy access points, as well as OoB legacy access points. In addition, based at least in part on the OoB discovery from the 2.4 GHz band of frequencies, the non-access-point station may scan a subset of channels in the 5 GHz band of frequencies and/or the 6 GHz band of frequencies for access points that are of interest. Note that the OoB signaling may be transmitted by an access point (which is sometimes referred to as a 'transmitting electronic device') in a beacon frame, a probe response and/or an ML probe response.

Figure 23:
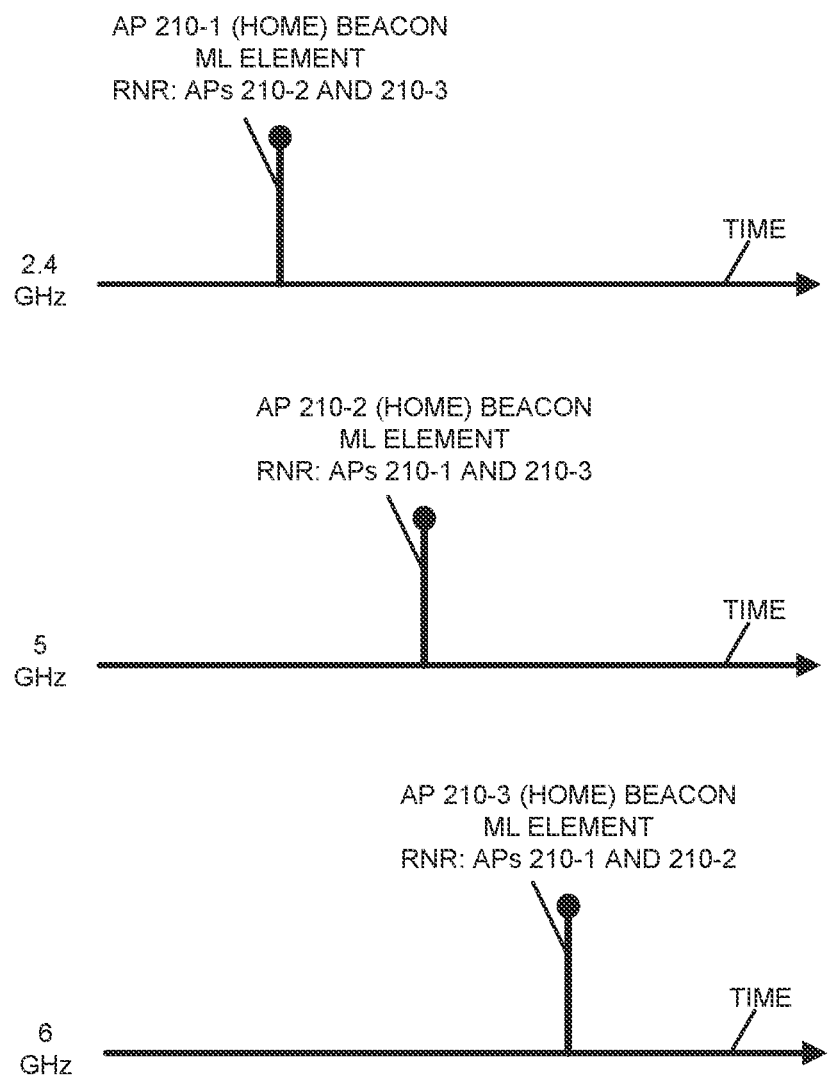
FIG. 23 is a drawing illustrating an example of communication between electronic devices.

Moreover, referring back to FIG. 2, access point 112 may be an AP MLD that hosts multiple access points 210 in different bands of frequencies. Furthermore, as shown in FIG. 23, which presents a drawing illustrating an example of communication between electronic devices, each of access points 210 may transmit beacon frames in the different bands of frequencies. Additionally, each beacon frame may include an ML element and/or an RNR with information about other access points that are cohosted or co-located in the same AP MLD (with the same SSID).

For example, in the 2.4 GHz band of frequencies, each beacon frame may include an ML element and/or an RNR with information about other access points, such as access point 210-2 and access point 210-3. Similarly, in the 5 GHz band of frequencies, each beacon frame may include an ML element and/or an RNR with information about other access points, such as access point 210-1 and access point 210-3, and in the 6 GHz band of frequencies, each beacon frame may include an ML element and/or an RNR with information about other access points, such as access point 210-1 and access point 210-2. Note that the ML element may include ML-level information and per-station parameters of access points 210 in the AP MLD.

Based at least in part on the information included in the beacon frames, a legacy station or a non-AP MLD (such as electronic device 110-1) may associate with the AP MLD. For example, the legacy station may associate with access point 210-1 in the 2.4 GHz band of frequencies. Alternatively, the non-AP MLD may include an ML entity having an ML address and multiple stations 218 in different bands of frequencies, including station 218-1 having address 1 in the 2.4 GHz band of frequencies, station 218-2 having address 2 in the 5 GHz band of frequencies, and station 218-3 having address 3 in the 6 GHz band of frequencies. The AP MLD and the non-AP MLD may establish multiple concurrent links 216 in different bands of frequencies between access points 210 and the stations 218.

Figure 24:
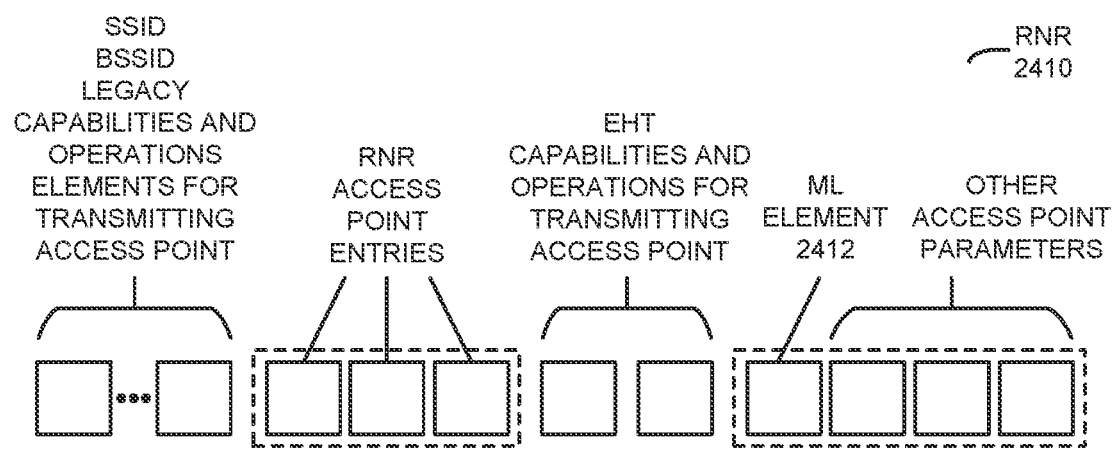
FIG. 24 is a drawing illustrating an example of a reduced neighbor report (RNR) communicated between electronic devices of FIG. 1 or 2.

FIG. 24 presents a drawing illustrating an example of an RNR 2410 (with an ML element 2412) communicated between electronic devices of FIG. 1 or 2, e.g., in beacon frames or probe responses. Notably, the beacon frames or probe responses may include information elements (IEs) (with the SSID, BSSID, legacy capabilities, operations elements for the transmitting access point, extremely high-throughput capability and operations for the transmitting access point) and RNR 2410. RNR 2410 may include legacy information (which can be received by all stations), information for IEEE-802.11ax or 'Wi-Fi 6E'-compatible stations (which cannot be received by legacy stations), and information for IEEE-802.11be-compatible stations (which can only be received by IEEE-802.11be-compatible stations). Note that an information about an access point may be included in RNR 2410 if it is: cohosted in a 6 GHz access point or cohosted in an AP MLD as the reporting access point that is providing RNR 2410. Alternatively or additionally, RNR 2410 may include information about one or more neighboring access points that are operating in the 2.4 GHz band of frequencies and/or the 5 GHz band of frequencies.

The legacy information in the RNR information may include: neighbor access-point information (one per reported channel), such as a co-located or cohosted access point, an operating class, a channel number, or a number of target beacon transmission time (TBTT) information sets (for BSSIDs in the same channel). Moreover, the legacy information in the RNR may include TBTT information set(s) (one per reporting access point or virtual access point), such as: a TBTT offset (e.g., a TBTT offset in 1 ms units), a BSSID, a short SSID, and/or a 20 MHz power spectral density or PSD (for an access point that operates in the 6 GHz band of frequencies). Furthermore, the IEEE-802.11be-compatible information in the TBTT information set(s) may include: a change sequence (CS), an MLD identifier (which identifies an MLD in an AP MLD) and a link identifier (such as, e.g., four bits that identify a given access point in an AP MLD). Additionally, the IEEE-802.11ax-compatible information in the TBTT information set(s) may include BSS parameters, such as: on channel tunneling or OCT (e.g., using 1 bit), a same SSID (e.g., using 1 bit), a multiple BSSID (e.g., using 1 bit), a transmitted BSSID (e.g., using 1 bit), a co-hosted or co-located extended service set or ESS (e.g., using 1 bit), and an unsolicited broadcast probe response transmission at least once every 20 ms (e.g., using 1 bit). Note that the beacon frame or the probe response may include ML element 2412 if secure authentication of equals (SAE) is in use, as well as per-station profiles with ML elements.

Figure 25:
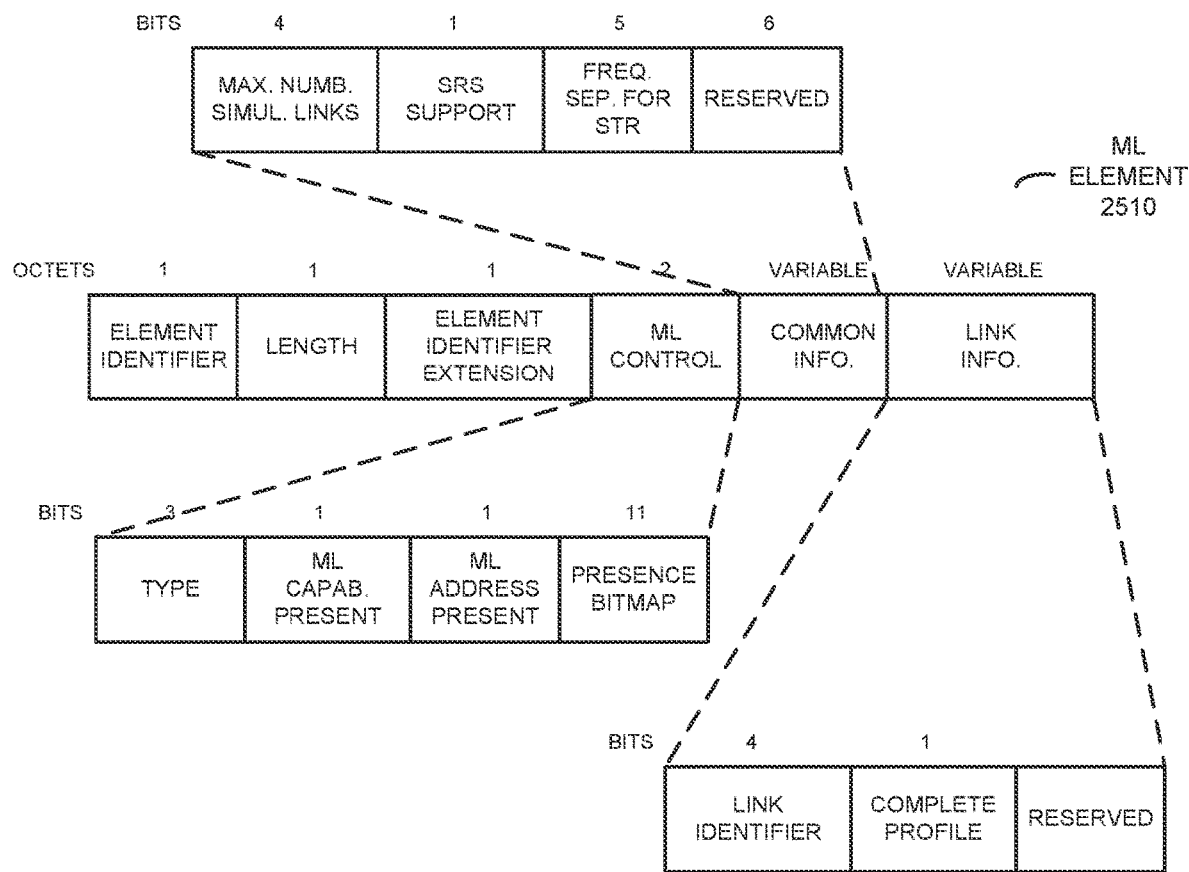
FIG. 25 is a drawing illustrating an example of a multi-link (ML) element communicated between electronic devices of FIG. 1 or 2.

Moreover, as shown in FIG. 25, which presents a drawing illustrating an example of an ML element 2510 communicated between electronic devices of FIG. 1 or 2, for IEEE 802.11be ML element 2510 may include two levels of parameters: common information that is common for an AP MLD or for all affiliated access points; and per-station parameters (for a given affiliated access point). Note that ML element 2510 may include a complete profile that signals whether selected parameters or a complete profile is present.

For example, ML element 2510 may include: an element identifier field (e.g., using 1 octet); a length field (e.g., using 1 octet); an element identifier extension field (e.g., using 1 octet); an ML control field (e.g., using 1 octet); a common information field (e.g., using 1 octet); and a link information field (e.g., using 1 octet). Moreover, the ML control field may include: a type subfield (e.g., using 3 bits); an ML capabilities present subfield (e.g., using 1 bit); an ML address present subfield (e.g., using 1 bit); and a presence bitmap field (e.g., using 11 bits). Furthermore, the common information field may include: a maximum number of simultaneous links subfield (e.g., using 4 bits); an SRS support subfield (e.g., using 1 bit); a frequency separation for STR subfield (e.g., using 5 bits), and a reserved subfield (e.g., using 6 bits). Additionally, the link information may include: a link identifier subfield (e.g., using 4 bits); a complete profile subfield (e.g., using 1 bit); and a reserved subfield. Note that the complete profile subfield indicates whether selected parameters or a complete profile is present.

In some embodiments, there may be different types of ML elements: a basic variant, and an ML probe request variant. The basic variant may be included in a beacon frame, an ML probe response, an association request or an association response, and may include: an MLD MAC address, optional sub-elements (such as a per-station profile) and/or vendor-specific information. Alternatively, the ML probe request variant may be included in an ML probe request, and may include request parameters from all or specific access point(s).

Furthermore, there may be different types of beacon frames in different bands of frequencies. For example, in the 2.4 GHz band of frequencies, beacon PPDU types may include a direct sequence spread spectrum (DSSS), beacon MCSs may include 1, 2, 5, 5 or 11 Mbps, and a beacon bandwidth may be 20 MHz. Alternatively, in the 2.4 GHz, 5 GHz or 6 GHz band of frequencies, beacon frames may include: a beacon PPDU type of a non-high throughput (HT) PPDU with a beacon MCS of the basic rate set, and a beacon bandwidth of 20 MHz; or a beacon PPDU type of an extended range single user (ER SU) PPDU with a beacon MCS of high efficiency (HE) MCS 1 and a number of spatial streams (NSS) of 1, and a beacon bandwidth of 20 MHz (or 242 resource units or RUs). In the 6 GHz band of frequencies, the beacon frames may include: a beacon PPDU type of a non-HT duplicate PPDU with a beacon MCS of the basic rate set, and beacon bandwidth up to the BSS bandwidth; or a beacon PPDU type of an HE SU PPDU with a beacon MCS of a basic HE MCS set, and a bandwidth of 20 MHz.

Additionally, there may be an additional mode HE multi-user (MU) PPDU mode for a probe response. Notably, in the 6 GHz band of frequencies, the probe response PPDU type may include an HE MU PPDE or a broadcast RU probe (with an association identifier or AID of 2045), an MCS of HE-MCS 1 and NSS of 1, and a probe response bandwidth of less than or equal to 106 RU in: the primary 20 MHz, the preferred scanning channel, or the subchannel selective transmission (SST)-station (STA) 20 MHz channel.

In some embodiments, there may be different transmission alternatives for group-addressed frames that are transmitted to some or all electronic devices. Note that group-addressed frames may be scheduled or a periodic, and/or may be used for service discovery (following beacon frames) or network maintenance. For example, in the 2.4 GHz, 5 GHz or 6 GHz band of frequencies, there may be: a non-HT PPDU with an MCS of the basic rate set, and a bandwidth of 20 MHz; an ER SU PPDU with an MCS of HE MCS 1 and a bandwidth of 20 MHz (242 RU); or an HE SU PPDU with an MCS of the basic HE MCS set, and a bandwidth of up to the bandwidth supported by all associated stations or 20 MHz. Alternatively, in the 2.4 GHz or 5 GHz band of frequencies, there may be: an HT PPDU with an MCS of the basic HT MCS set, and a bandwidth of up to the bandwidth supported by all associated stations; or a very high throughput (VHT) PPDU with an MCS of the basic VHT MCS set, and a bandwidth of up to the bandwidth supported by all associated stations. In the 6 GHz band of frequencies, there may be: a non-HT MU PPDU with an MCS of the basic rate set and a bandwidth up to the BSS bandwidth; or an HE MU PPDU broadcast RU with an MCS of the basic HE MCS set, and a bandwidth less than or equal to 106 RU subcarriers or 20 MHz within the bandwidth of the receiver stations.

Referring back to FIG. 2, the aforementioned functions and capabilities may be used or modified to enable the disclosed communication techniques. Notably, the beacon frame type information and/or the group frame type information may be modified to include additional or modified signaling, additional or modified elements and/or additions to the RNR and/or the ML element. For example, the beacon frame type information may be used in scanning and/or selecting a scanning radio versus a data radio and the receive bandwidth. These capabilities may allow a more-capable data radio to be used for scanning instead of a scanning radio, and/or may be used in planning affiliated access-point coverage and transmission modes. Moreover, the group frame type information may be used to select the scanning radio versus the data radio and a link for receiving group frames (which are sometimes referred to as 'group-addressed frames'). These capabilities may allow a more-capable data radio to be used for scanning instead of a scanning radio, and/or may allow access-point improvement or optimization of group-frame transmissions for associated non-AP MLDs. In some embodiments, the beacon frame type information and/or the group frame type information may facilitate a reduced transmission rate because the beacon frames and/or the group frames may be received with any of the multiple concurrent links (e.g., via OoB communication). For example, this may allow the beacon frames and/or the group frames to be received without prior association in the 2.4 GHz band of frequencies.

The station and the access point may signal a complete set of per-station parameters, such as their operating parameters for each link they setup in the association. The non-AP MLD may signal the affiliated station parameters for each link and the access point may signal some or all affiliated access-point parameters for each link it accepts. The AP MLD may signal beacon and group parameters for each link that is setup in an ML association. This may ensure that the non-AP MLD knows the operating parameters for the links.

Furthermore, in the disclosed communication techniques, signaling to support setting of beacon and/or group frame types is disclosed. For example, the current and the next parameter values for beacon and/or group frame types may be provided. Alternatively or additionally, a station may request additional or modified transmission frame types and may provide measurement reports for beacon and/or group frames. In some embodiments, an AP MLD may configure access points that may modify beacon and/or group frame types.

A data radio and a scanning radio may have different characteristics. Notably there may be different radios in a non-AP MLD, including: a data radio (radio 1) in the 2.4 GHz band of frequencies, a data radio (radio 2) in the 5 GHz or 6 GHz band of frequencies, and a scanning radio (radio 3) in the 2.4 GHz, 5 GHz or 6 GHz band of frequencies. A data radio may: be able to transmit; receive up to 160 MHz using all relevant MCSs and most PPDU types; have availability that depends on a data transmission schedule and have high power consumption; and receive all beacon types (but may need to be configured for larger receive bandwidth). A scanning radio may: not be able to transmit; receive only 20 MHz of bandwidth with up to MCS 4 and only non-HT PPDU; always be available and have smaller power consumption; not receive all beacon types.

In the disclosed communication techniques, OoB discovery of another access point may occur during a scan for beacon frames and/or using group-addressed frames. For example, a data radio may perform a scan in a first band of frequencies and may receive a beacon frame associated with a first access point with information about a second access point in a second, different band of frequencies. Alternatively, a data radio may receive a group-addressed frame associated with a first access point in a first band of frequencies with information about a second access point in a second, different band of frequencies.

Figure 26:
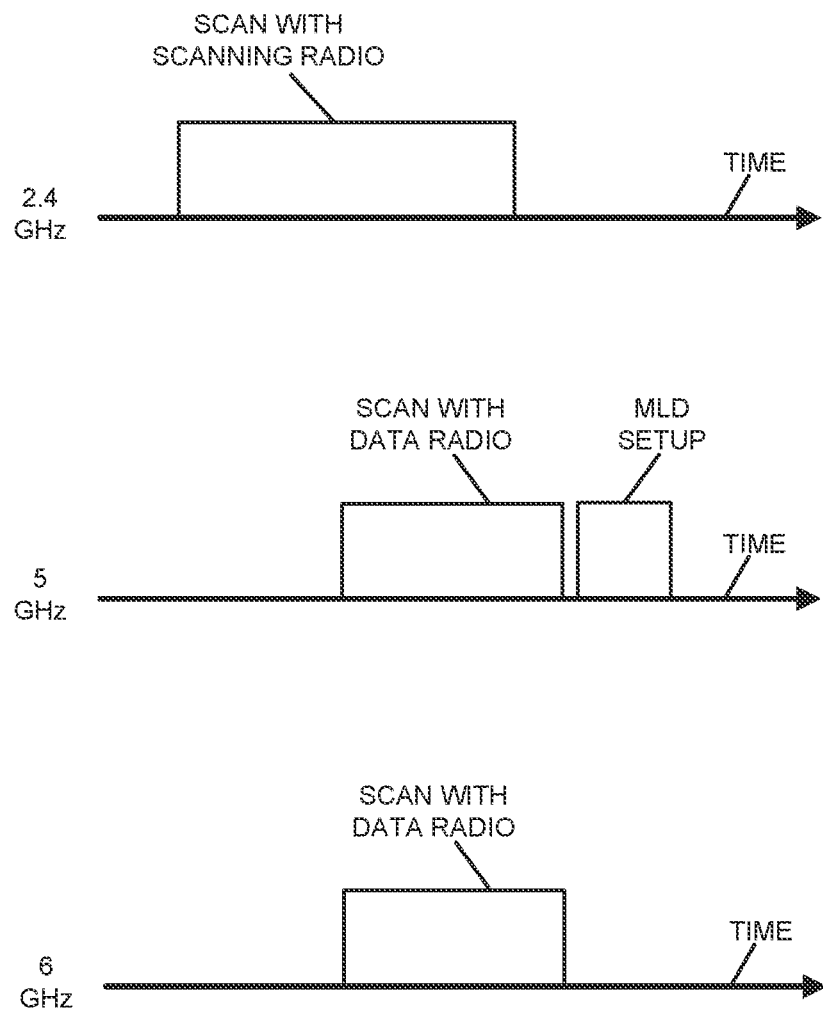
FIG. 26 is a drawing illustrating an example of communication between electronic devices.

Moreover, in the communication techniques, a variety of different ML scanning operations are disclosed. For example, as shown in FIG. 26, which presents a drawing illustrating an example of communication between electronic devices, when a station is not currently associated with an access point, OoB discovery may occur during initial scanning. Notably, a link may be setup after all bands of frequencies are scanned. Thus, a scanning radio may perform a scan in the 2.4 GHz band of frequencies, and one or more data radios may perform additional scans in the 5 GHz and 6 GHz bands of frequencies, which may discover more detailed information than the initial scan. Then, a link with an AP MLD may be setup, e.g., in the 5 GHz band of frequencies.

Figure 27:
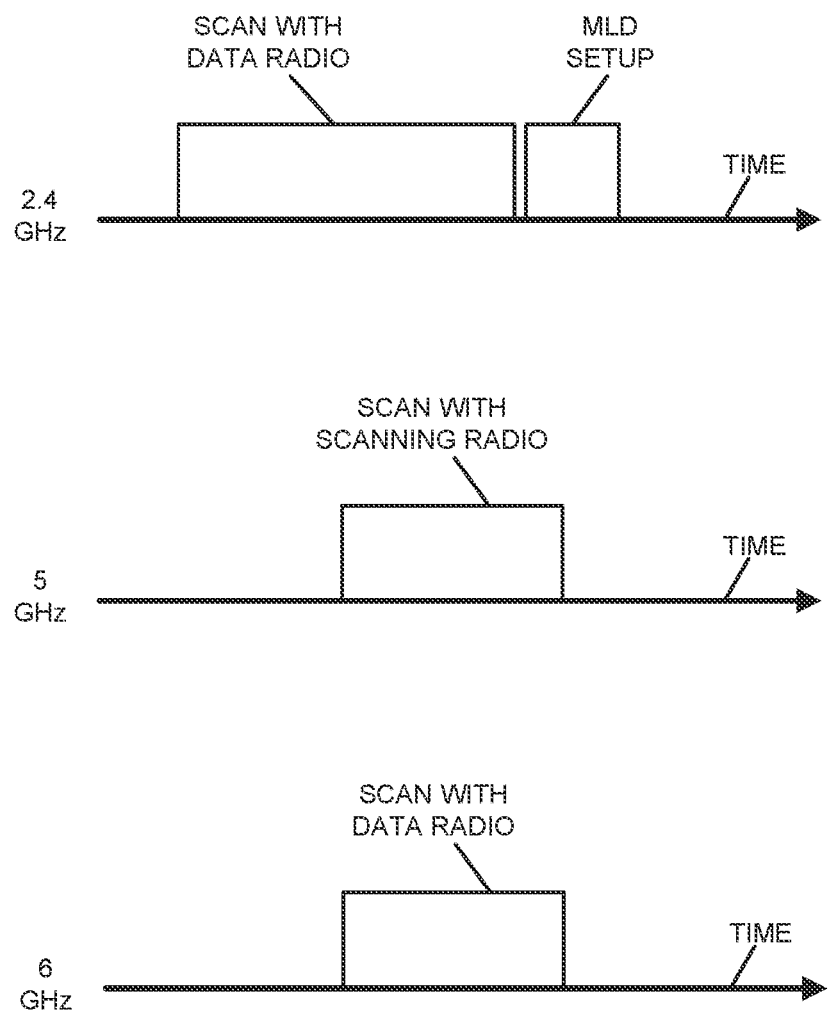
FIG. 27 is a drawing illustrating an example of communication between electronic devices.

Alternatively, as shown in FIG. 27, which presents a drawing illustrating an example of communication between electronic devices, a link may be set up after an initial scan in a first band of frequencies while (or concurrently) with additional scans in other bands of frequencies, which may discover more detailed information than the initial scan. Thus, a data radio may perform a scan in the 2.4 GHz band of frequencies, and may initiate scans by a scanning radio in the 5 GHz band of frequencies and another data radio in the 6 GHz band of frequencies, while a link with an AP MLD is set up in the 2.4 GHz band of frequencies.

Figure 28:
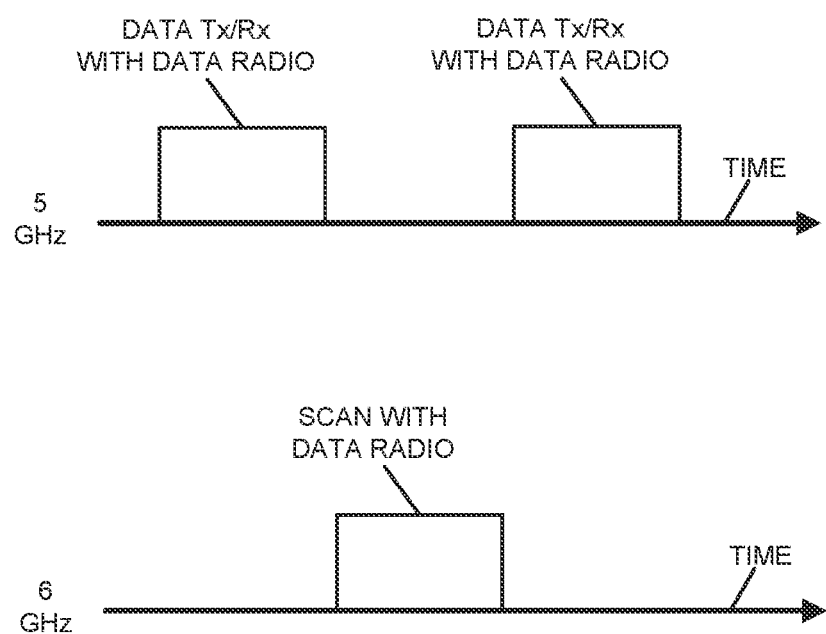
FIG. 28 is a drawing illustrating an example of communication between electronic devices.

Furthermore, as shown in FIG. 28, which presents a drawing illustrating an example of communication between electronic devices, scanning may occur after a station is associated. For example, a data radio may switch from transmitting/receiving in the 5 GHz band of frequencies (e.g., based at least in part on the OoB information) to scan a channel in the 6 GHz band of frequencies to receive a special beacon frame type. This may allow the non-AP MLD to use a data radio to discover one or more other access points, but may cause an interruption to data communication in the 5 GHz band of frequencies.

Figure 29:
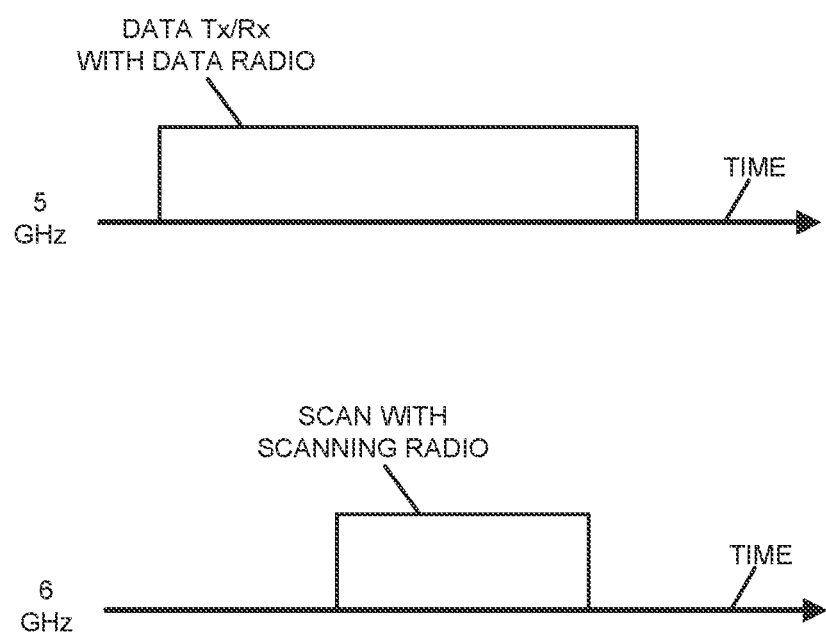
FIG. 29 is a drawing illustrating an example of communication between electronic devices.

Instead, as shown in FIG. 29, which presents a drawing illustrating an example of communication between electronic devices, in some embodiments while a data radio is transmitting or receiving in the 5 GHz band of frequencies, the data radio may initiate (e.g., based at least in part on the OoB information) a scan by a scanning radio in the 6 GHz band of frequencies. For example, a non-AP MLD may know the transmitted beacon type, so it may use the scanning radio. Thus, the scanning radio may be used to receive a non-HT beacon frame type without a break or interruption in data communication in the 5 GHz band of frequencies.

Figure 30:
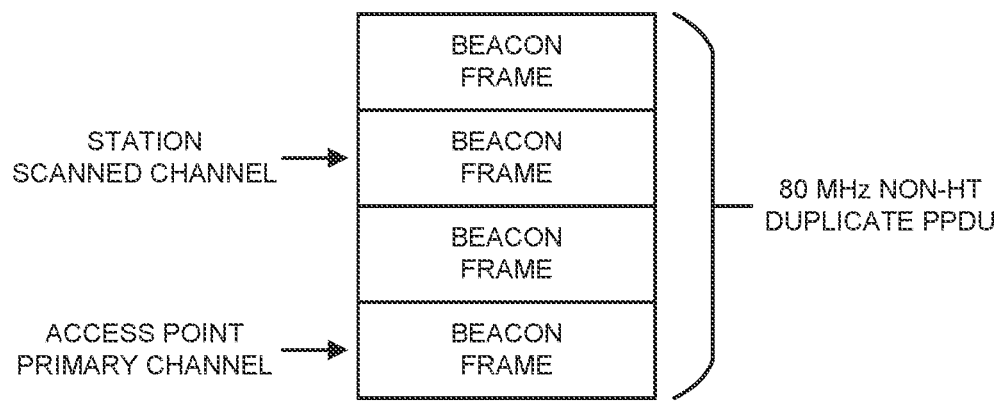
FIG. 30 is a drawing illustrating an example of a non-high-throughput duplicate physical layer convergence protocol (PLCP) protocol data unit (PPDU).

The use of OoB information may address the challenges of non-HT duplicate PPDU beacon reception in the 6 GHz band of frequencies. Notably, as shown in FIG. 30, which presents a drawing illustrating an example of a non-HT duplicate PPDU, a station may not know the primary channel of an access point. For example, the station may receive a beacon frame transmitted as non-HT Duplicate PPDU. In other beacon frame types, the beacon frame can be received only in the primary channel of the access point, but in this case the station may receive the beacon frame on other channels. However, because the beacon frame does not signal the primary channel of the access point, and because the access point may only receive frames in its primary channel, the scanning station may need to test different channels to locate the primary channel of the access point.

Figure 31:
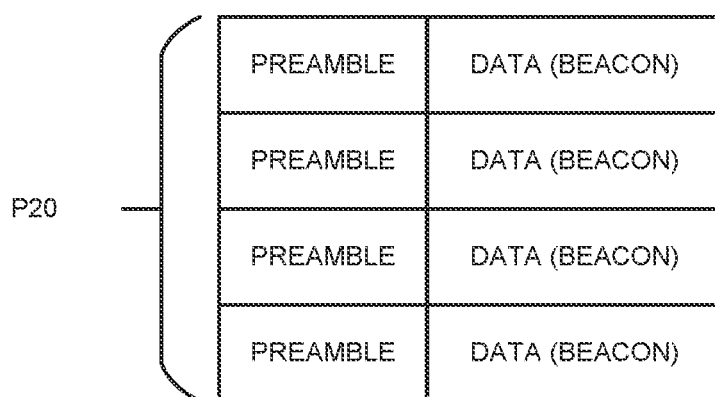
FIG. 31 is a drawing illustrating an example of a beacon frame.

Alternatively or additionally, a station may not know the non-HT duplicate PPDU beacon bandwidth. Notably, as shown in FIG. 31, which presents a drawing illustrating an example of a beacon frame, the RNR may provide: the primary 20 MHz (P20) channel and band; and the maximum power spectral density at P20. However, the RNR may not signal: whether the access point transmits 80 MHz wide non-HT Duplicate beacon frames; and/or whether the access point receives 80 MHz wide non-HT duplicate PPDUs. If the scanning station has this information, it could increase the network uplink (UL) and downlink (DL) coverage by, e.g., scanning for 80 MHz wide beacon frames and/or transmit 80 MHz wide link setup frames.

In order to facilitate these capabilities in the communication techniques, the access point may transmit modified beacon frame type information. Notably, the PPDU type and MCS of the beacon and group-addressed frames affect the BSS range. For example, an access point may reduce the BSS range by using higher transmission rates. Note that enterprise access points and access points in public venues may increase access-point density and transmission rates in a network by transmitting beacon frames only at high data rates. Moreover, FCC regulations in the 6 GHz band of frequencies allow an access point to enlarge the BSS range by transmitting beacon frames in the non-HT Duplicate PPDUs with larger than 20 MHz transmission bandwidth. A scanning station can receive beacon frames at a long range if the scanning station receives packets or frames using a larger receive bandwidth. However, as discussed previously, the current signaling does not indicate when a scanning station should use a large receive bandwidth. When the scanning station knows the beacon frame and/or probe response frame transmission format, the scanning station may improve or optimize a scanning radio for the beacon frame or probe response frame it tries to receive. This may reduce the scanning station power consumption and/or may ensure reliable reception. Alternatively, in a high-density deployment, a reduced range may be more helpful and may provide improved communication performance (such as higher throughput). In some embodiments, an AP MLD with maximized ranges may: transmit beacon frames at 1 Mbps from access point 210-1 in the 2.4 GHz band of frequencies; transmit beacon frames at 6 Mbps from access point 210-2 in the 5 GHz band of frequencies; and transmit beacon frames and/or 160 MHz non-HT duplicate PPDUs at 6 Mbps from access point 210-3 in the 6 GHz band of frequencies.

Moreover, in order to facilitate the capabilities in the communication techniques, the access point may transmit (such as after association and authentication) modified group-addressed frame type information. Notably, affiliated access points may transmit group frames with different data rates and PPDU types. The group-addressed frame transmission parameters signaling may help the associated non-AP MLD to: receive group-addressed frames from an affiliated access point that has the most-suitable transmission rate (e.g., for reliable reception, for a small or reduced receive time to save power, and/or using an optimal receive mode to receive the frames with minimum power consumption); and/or detect group-addressed frames transmission rate changes. Furthermore, the associated AP MLD may use group-addressed frame transmission parameters to: receive group frames with a scanning radio (the group frames may be transmitted at a low rate, but the reduced or small power consumption of the scanning radio may justify the operation); and/or receive group frames with a data radio (the group frames may be transmitted using high modulation in a reduced or small amount of time and/or the reduced length of operation of the data radio may not increase the overall power consumption). In some embodiments, access point 210-1 in an AP MLD may transmit group frames at 6 Mbps in the 2.4 GHz band of frequencies, access point 210-2 in the AP MLD may transmit group frames at 24 Mbps in the 5 GHz band of frequencies, and access point 210-3 in the AP MLD may transmit group frames with HE SU MCS 6 in the 6 GHz band of frequencies. Additionally, station 218-1 in a non-AP MLD may use a data radio in the 2.4 GHz band of frequencies, station 218-2 in the non-AP MLD may use a data radio in the 5 GHz or 6 GHz band of frequencies, and station 218-3 in the non-AP MLD may use a scanning radio in the 2.4 GHz, 5 GHz or 6 GHz band of frequencies.

Figure 32:
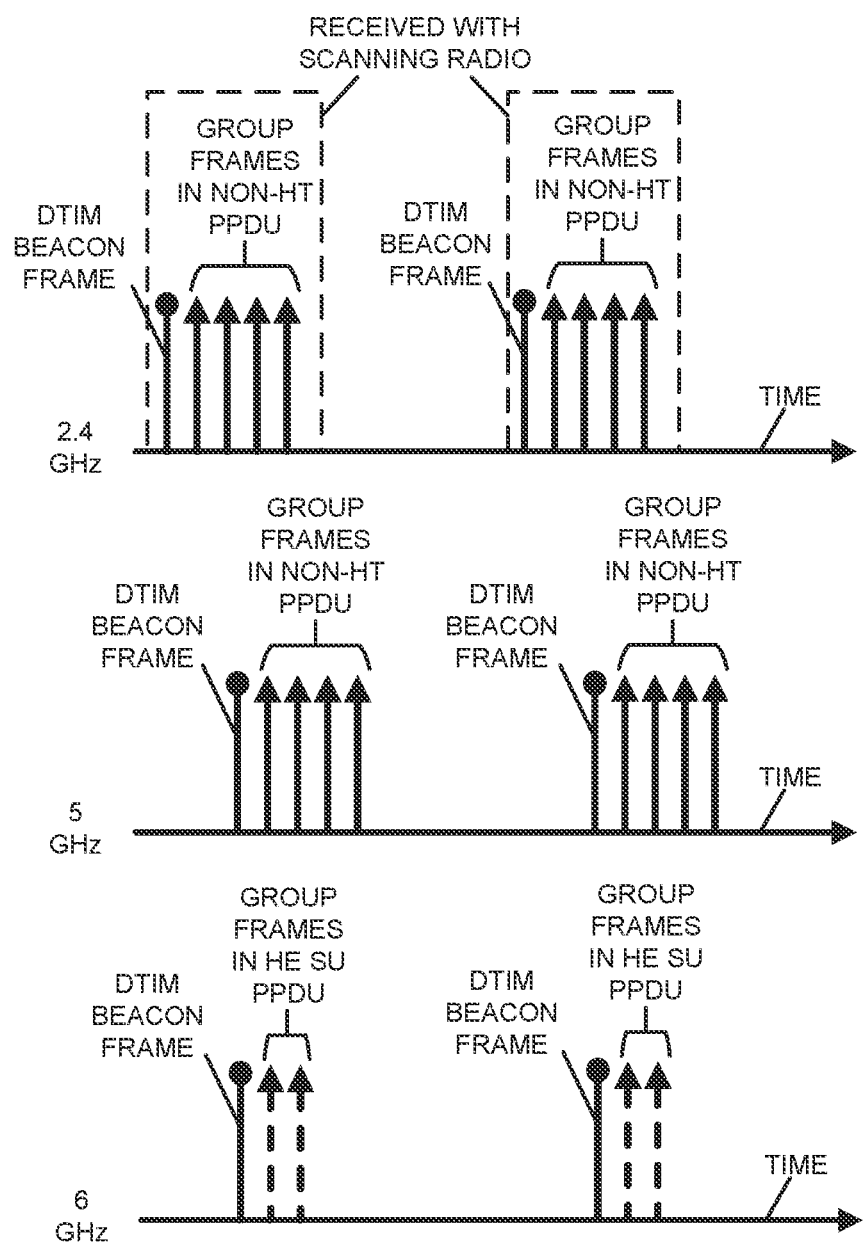
FIG. 32 is a drawing illustrating an example of communication between electronic devices.

An example of scanning radio and data radio use to receive group frames is shown in FIG. 32, which presents a drawing illustrating an example of communication between electronic devices. Note that a non-AP MLD may have three concurrent links with an AP MLD. Initially, no active data transmission may be ongoing. The station may receive, using a scanning radio and via the link in the 2.4 GHz band of frequencies, delivery traffic indication message (DTIM) beacons and group frames in a non-HT PPDU at 6 Mbps. Moreover, the station may not receive, via the link in the 5 GHz band of frequencies, DTIM beacons and group frames in a non-HT PPDU at 6 Mbps. Furthermore, the station may not receive, via the link in the 6 GHz band of frequencies, DTIM beacons and group frames in a HE SU PPDU at 65 Mbps.

Figure 33:
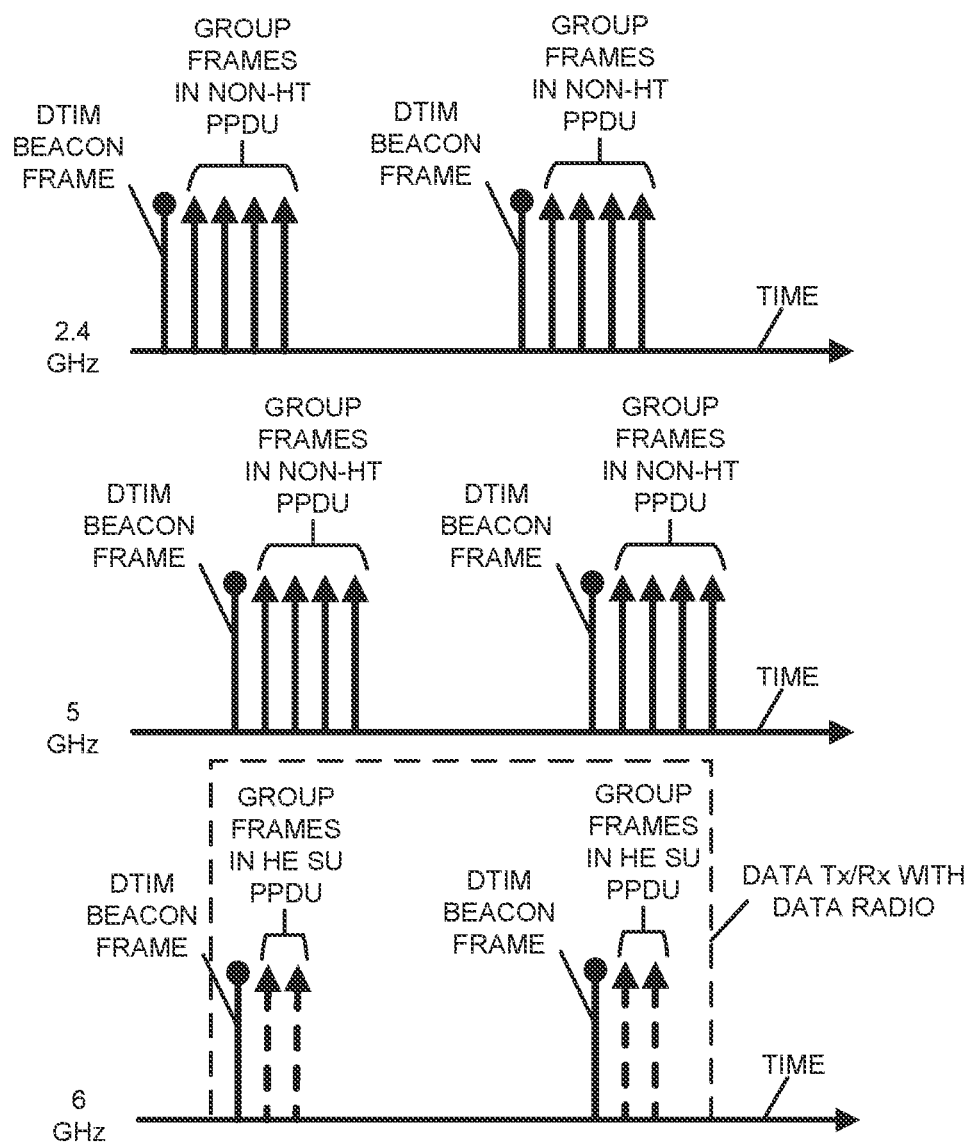
FIG. 33 is a drawing illustrating an example of communication between electronic devices.

Alternatively, as shown in FIG. 33, which presents a drawing illustrating an example of communication between electronic devices, when data transmission or reception is ongoing, the station may not receive, via the link in the 2.4 GHz band of frequencies, DTIM beacons and group frames in a non-HT PPDU at 6 Mbps. Moreover, the station may not receive, via the link in the 5 GHz band of frequencies, DTIM beacons and group frames in a non-HT PPDU at 6 Mbps. Furthermore, the station may receive, using a data radio and the link in the 6 GHz band of frequencies, DTIM beacons and group frames in a HE SU PPDU at 65 Mbps.

Thus, a scanning radio may be relevant, if the station is in a long-term power saving mode and it not actively sending data. In these embodiments, the scanning radio may periodically wake up only to receive DTIM beacon and group frames. Alternatively, during ongoing data exchange, group frames may be received similarly to data. Consequently, a station may perform discovery of group-addressed frames even when another radio in the station is actively transmitting or performing discovery in a different band of frequencies.

We now describe embodiments of signaling for beacon frame information and/or group frames type information in the communication techniques. In signaling for legacy (non-IEEE 802.11be) stations, the legacy access points do not have any beacon frame type element and/or group frames transmission type signaling. For the legacy (non-IEEE 802.11be) stations, the signaling for beacon frame and probe response may include: an RNR to indicate co-located or cohosted access points (so that a station can detect the beacon transmit parameters of other access points); and/or elements may be added to the frame body to signal transmitting access-point parameters (so a station can know whether the access point sends larger than 20 MHz beacon frames and the primary channel of the access point). Moreover, the signaling for an association response may include an element in the frame body to signal the transmitting access-point parameters (so a station can know whether the access point sends larger than 20 MHz beacon frames in the group-frame transmit parameters). Furthermore, the signaling for BSS transition management may include that an access point may request a station to transition to a candidate access and provide beacon and group frames parameters of the candidate access point (so that the station can detect the candidate access-point beacon transmission mode, which may help or facilitate access-point discovery).

In contrast, the additional or modified information in the communication techniques may be include in an AP MLD beacon frame and/or ML-probe response frame. Notably, an element in the body of the association request or response, the beacon frame or the probe response may report information of the transmitting access point using a complete set of information elements (which may have a size in octets). Moreover, an RNR may include information of co-located or cohosted (in the same physical access point) or neighboring access points. Note that the access points in an AP MLDS may be present in the RNR. In addition, a very short formal size (e.g., in bits) may be used to convey: the operating channel, the BSSID, the SSID, the TBTT, etc. Furthermore, the ML element may include common parameters, such as ML-level common information of the access points in an AP MLD. Note that the ML element may include parameters for each access point in an AP MLD or ML-level parameters. Additionally, the ML element may include per-station parameters, such as information for other access points in an AP MLD using an information element that is similar to those in a beacon body. In some embodiments, the RNR and/or the per-station parameters in the ML element may be used to convey the beacon frame type information.

In some embodiments of the disclosed communication techniques, the additional or modified information fields and elements may include: the RNR, the beacon frame type information element, the group frame type information element, the beacon frame type subfield in the per-station profile in the ML element, and/or the group frame type information in the per-station profile in the ML element. Notably, in the RNR of the reported device, the co-located or cohosted and neighbor access-point parameters may include a reserved bit for legacy (IEEE 802.11ax) support and up to four additional bits to indicate IEEE 802.11be support.

Moreover, the beacon frame type information element and/or the group frame type information element in a beacon frame, probe response and/or association frames may signal the transmitting access-point parameters of the reported device. For example, these information elements may include an additional 6 octet long element to indicate legacy (IEEE 802.11 ax) support and IEEE 802.11be support. Alternatively, the beacon frame type information element and/or the group frame type information element in a BSS transition management frame may signal candidate access-point parameters. For example, these information elements may include an additional 5 octet long element to indicate legacy (IEEE 802.11 ax) support and IEEE 802.11be support.

Furthermore, the beacon frame type information subfield in the per-station profile in the ML element and/or the group frame type information in the per-station profile in the ML element may include affiliated access-point parameters in an AP MLD of the reported device. In these embodiments, there may not be an indication of legacy (IEEE 802.11 ax) support and IEEE 802.11be support may be include in the per-station profile for an affiliated station.

Additionally, in some embodiments there may be additional or modified RNR fields for the reported AP beacon frame or discovery information element. This is shown in FIGS. 34 and 35, which present drawings illustrating examples of an RNR. Notably, the RNR element may use a few reserved bits to signal the beacon frame type of reported access points. For example, one or more additional subfields may use a reserved bit in a BSS parameters subfield 3410 to indicate that the beacon frame is other than a non-HT beacon frame to an IEEE 802.11ax-compatible station, and/or one or more additional subfields may use reserved bits in an MLD parameters subfield 3510 to indicate larger than a 20 MHz PPDU and/or pre-associated long range to an IEEE 802.11be-compatible station. More generally, one or more additional subfields may use a reserved bit in a BSS parameters subfield 3410 to indicate the beacon frame type. These changes to the RNR may help in selection of a scanning radio or a data radio for access-point scanning; and/or may help select the probe request and/or association request frame format.

In some embodiments, the other than non-HT beacon bit may be set, e.g., to '1' when the access point transmits beacon frames in a non-HT PPDU format or non-HT duplicate PPDU (which may have a beacon transmission data rate that is less than or equal to 24 Mbps); and/or may be set, e.g., to '0' otherwise (such as when the beacon transmission data rate is greater than 24 Mbps). Moreover, the pre-associated long-range bit may be, e.g., set to '1' if an access point receives UL class 1 and class 2 frames, e.g., frames that can be transmitted in pre-associated state, from non-associated stations on any supported MCSs and PPDU types. Furthermore, the larger than 20 MHz PPDU bit may be set, e.g., to '1' if a beacon frame is transmitted using greater than 20 MHz bandwidth.

Figure 36:
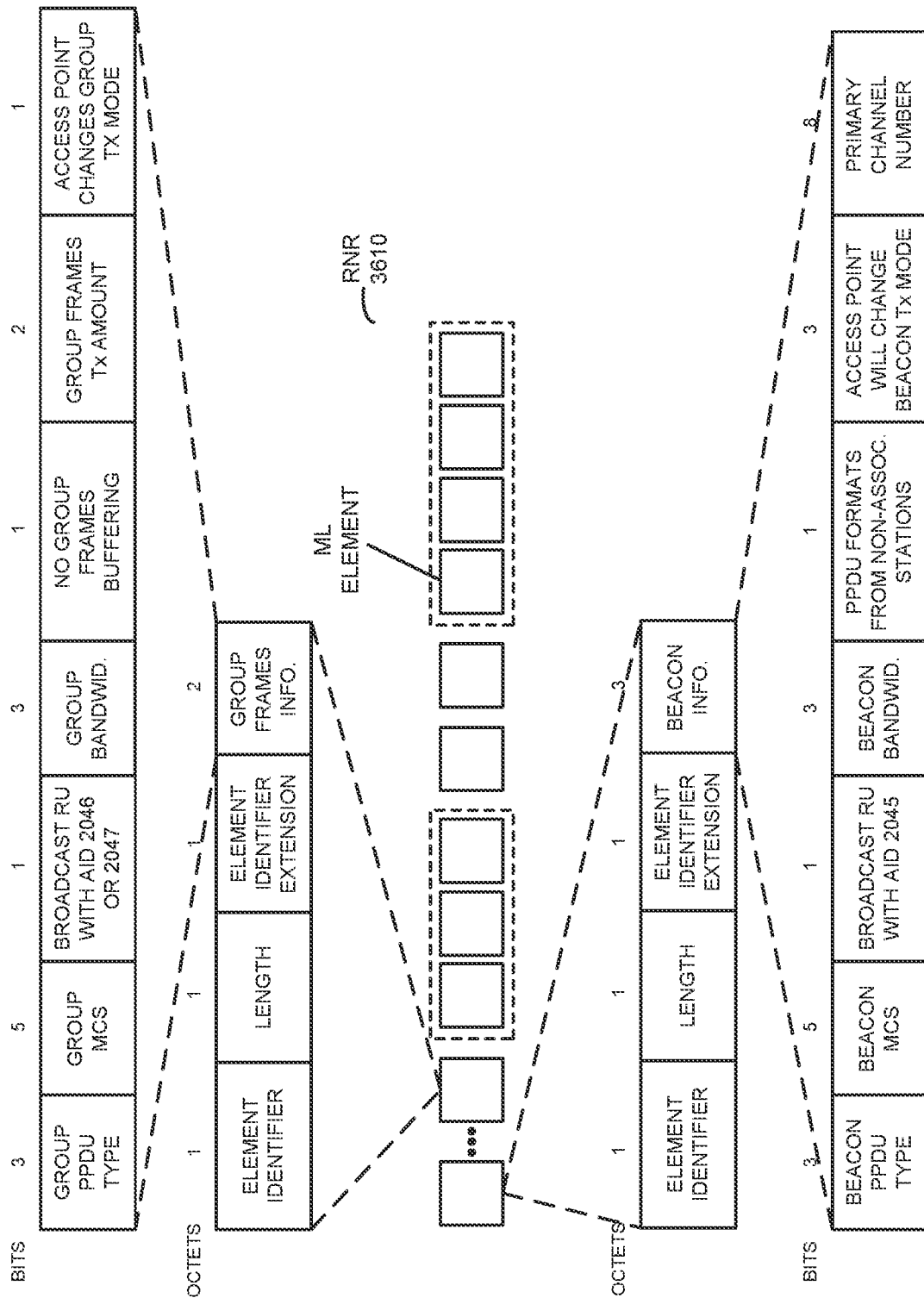
FIG. 36 is a drawing illustrating an example of an RNR.

Moreover, FIG. 36, which presents a drawing illustrating an example an RNR 3610, summarizes the additional or modified elements in RNR 3610 for beacon frame, probe-response and group-addressed frame information. Notably, as discussed further below in Tables 1-4, information in RNR 3610 specifying a beacon frame and a probe response may include: an element identifier subfield (e.g., using 1 octet), a length subfield (e.g., using 1 octet), an element identifier extension subfield (e.g., using 1 octet), and a beacon information subfield (e.g., using 3 octets). The beacon information subfield may include: a beacon PPDU type (e.g., using 3 bits), a beacon MCS (e.g., using 5 bits), a broadcast RU with AID of 2045 (e.g., using 1 bit), a beacon bandwidth (e.g., using 3 bits), all PPDU formats received from non-associated stations (e.g., using 1 bit), an indication that an access point will change beacon transmission mode (e.g., using 3 bits), and/or a primary channel number (e.g., using 8 bits). Note that the primary channel number of the reported access point may be defined with an operating class. Alternatively or additionally, information in RNR 3610 specifying a group-addressed frame may include: an element identifier subfield (e.g., using 1 octet), a length subfield (e.g., using 1 octet), an element identifier extension subfield (e.g., using 1 octet), and a group-frames information subfield (e.g., using 2 octets). The group-frames information subfield may include: a group PPDU type (e.g., using 3 bits), a group MCS (e.g., using 5 bits), a broadcast RU with AID of 2046 or 2047 (e.g., using 1 bit), a group bandwidth (e.g., using 3 bits), an indication of no group frames buffering (e.g., using 1 bit), a group frames transmission amount (e.g., using 2 bits), and/or access-point changes to a group transmission mode (e.g., using 1 bit).

Figure 37:
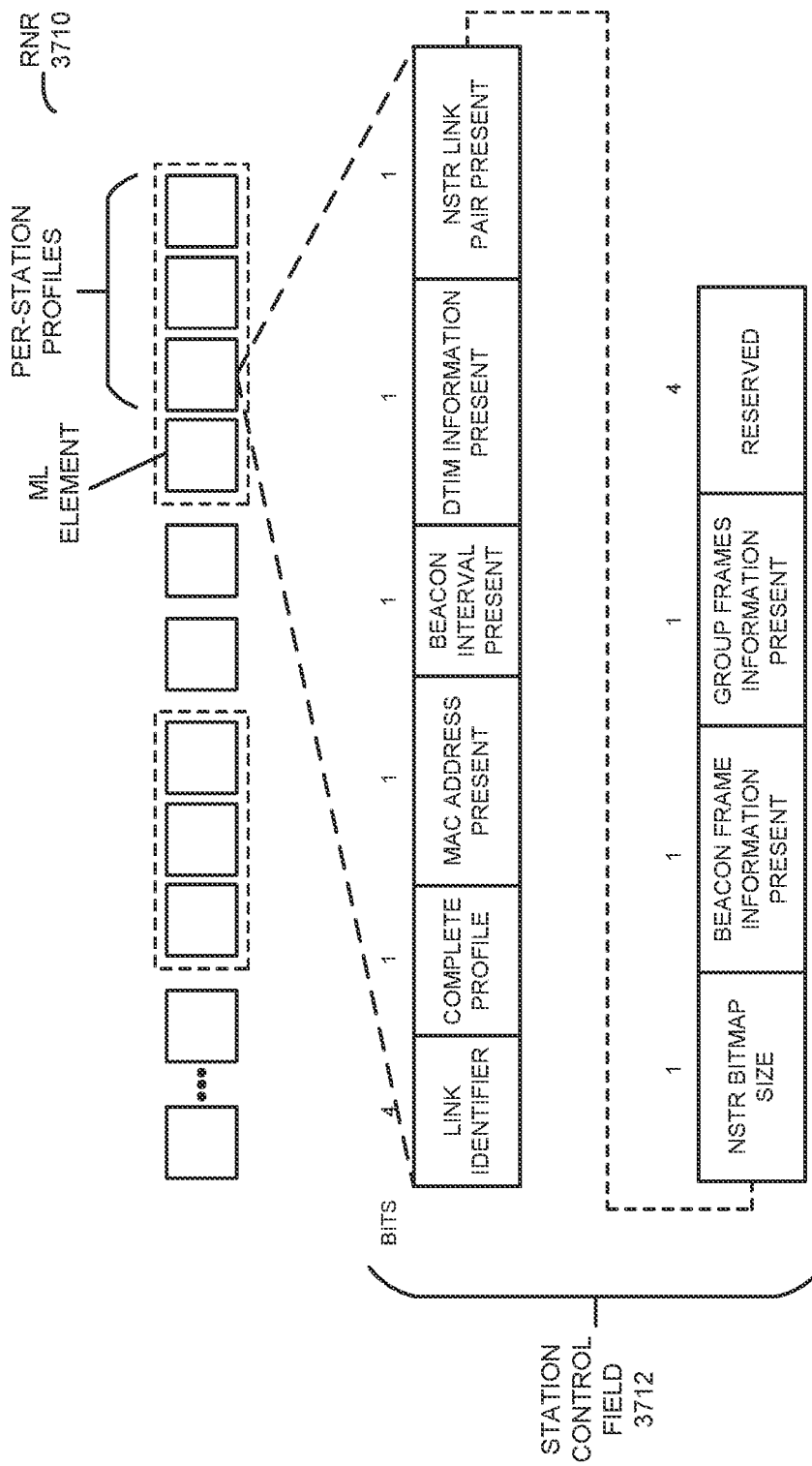
FIG. 37 is a drawing illustrating an example of a beacon or a discovery frame information subfield.

Furthermore, FIG. 37, which presents a drawing illustrating an example of a beacon or a discovery frame information subfield, summarizes the additional or modified per-station profile fields for beacon and group frames information. Notably, the ML element may signal, for each per-station profile, the beacon and group frames transmission parameters for the reported access points. In some embodiments, a station control field 3712 in RNR 3710 may include: a link identifier subfield (e.g., using 4 bits), a complete profile subfield (e.g., using 1 bit), a MAC address present subfield (e.g., using 1 bit), a beacon interval present subfield (e.g., using 1 bit), a DTIM information present subfield (e.g., using 1 bit), an NSTR link pair present subfield (e.g., using 1 bit), an NSTR bitmap size subfield (e.g., using 1 bit), a beacon frame information present subfield (e.g., using 1 bit), a group frames information present subfield (e.g., using 1 bit), and a reserved subfield (e.g., using 4 bits). As described further below, the beacon frame information present subfield may indicate whether beacon frame information is present, and the group frames information present subfield may indicate whether group frames information is present.

Referring back to FIG. 36, the beacon frame information subfield may include the transmission parameters of the beacon frames of the reported access point, including: the beacon PPDU type (e.g., using 3 bits), which defines the beacon frame PPDU type of the reported access point; the beacon MCSs (e.g., using 5 bits), which are discussed further below in Tables 1-4; the Broadcast RU with AID 2045 (e.g., using 1 bit), which indicates whether the reported access point transmits a probe response or fast initial link setup (FILS) discovery frames in a broadcast RU of a DL HE MU PPDU; the beacon bandwidth (e.g., using 3 bits), which indicates the bandwidth of the beacon PPDU; the all PPDU formats received from non-associated stations (e.g., using 1 bit), which indicate whether the reported access point receives all PPDU formats from non-associated stations; and/or the access point will change beacon transmission mode (e.g., using 3 bits), which contains a number of beacon intervals when the access point will change its beacon values.

For the beacon PPDU type: a value of '0' may indicate a non-HT PPDU; a value of '1' may indicate an ER SU PPDU; a value of '2' may indicate an HE SU PPDU; a value of '3' may indicate a non-HT duplicate PPDU; and values of '4' through '7' may be reserved. Moreover, for the beacon bandwidth: a value of '0' may indicate a 20 MHz bandwidth; a value of '1' may indicate a 40 MHz bandwidth; a value of '2' may indicate an 80 MHz bandwidth; a value of '3' may indicate a 160 MHz bandwidth; a value of '4' may indicate a 320 MHz bandwidth; and values of '4' through '7' may be reserved. Additionally, for the access point will change beacon transmission mode: a value of '0' may signal that no change is coming; and if the value is greater than '0,' then the access point may include two beacon information elements, where the first includes the current parameters and the second includes the new values.

Moreover, for the different beacon PPDU types, Tables 1 and 2 show, for HT, VHT, HE, and/or EHT MCSs, the number of spatial streams, the modulation and/or the coding. Furthermore, for the different beacon PPDU types, Tables 3 and 4 show, for IEEE 802.11be DSSS data rates and non-HT OFDMA MCSs, modulation and/or coding.

TABLE 1

| HTMCS | Spatial Streams | Modulation | Coding |
|---|---|---|---|
| 0 | 1 | BPSK | 1/2 |
| 1 | 1 | QPSK | 1/2 |
| 2 | 1 | QPSK | 3/4 |
| 3 | 1 | 16 QAM | 1/2 |
| 4 | 1 | 16 QAM | 3/4 |
| 5 | 1 | 64 QAM | 2/3 |
| 6 | 1 | 64 QAM | 3/4 |
| 7 | 1 | 64 QAM | 5/6 |
| 8 | 2 | BPSK | 1/2 |
| 9 | 2 | QPSK | 1/2 |
| 10 | 2 | QPSK | 3/4 |
| 11 | 2 | 16 QAM | 1/2 |
| 12 | 2 | 16 QAM | 3/4 |
| 13 | 2 | 64 QAM | 2/3 |
| 14 | 2 | 64 QAM | 3/4 |
| 15 | 2 | 64 QAM | 5/6 |
| 16 | 3 | BPSK | 1/2 |
| 17 | 3 | QPSK | 1/2 |
| 18 | 3 | QPSK | 3/4 |
| 19 | 3 | 16 QAM | 1/2 |
| 20 | 3 | 16 QAM | 3/4 |
| 21 | 3 | 64 QAM | 2/3 |
| 22 | 3 | 64 QAM | 3/4 |
| 23 | 3 | 64 QAM | 5/6 |
| 24 | 4 | BPSK | 1/2 |
| 25 | 4 | QPSK | 1/2 |
| 26 | 4 | QPSK | 3/4 |
| 27 | 4 | 16 QAM | 1/2 |
| 28 | 4 | 16 QAM | 3/4 |
| 29 | 4 | 64 QAM | 2/3 |
| 30 | 4 | 64 QAM | 3/4 |

TABLE 2

| VHT MCS | HE MCS | EHT MCS | Modulation | Coding |
|---|---|---|---|---|
| 0 | 0 | 0 | BPSK | 1/2 |
| 1 | 1 | 1 | QPSK | 1/2 |
| 2 | 2 | 2 | QPSK | 3/4 |
| 3 | 3 | 3 | 16 QAM | 1/2 |
| 4 | 4 | 4 | 16 QAM | 3/4 |
| 5 | 5 | 5 | 64 QAM | 2/3 |
| 6 | 6 | 6 | 64 QAM | 3/4 |
| 7 | 7 | 7 | 64 QAM | 5/6 |
| 8 | 8 | 8 | 256 QAM | 3/4 |
| 9 | 9 | 9 | 256 QAM | 5/6 |
|  | 10 | 10 | 1024 QAM | 3/4 |

TABLE 2-continued

| VHT MCS | HE MCS | EHT MCS | Modulation | Coding |
|---|---|---|---|---|
|  | 11 | 11 | 1024 QAM | 5/6 |
|  |  | 12 | 4096 QAM | 3/4 |
|  |  | 13 | 4096 QAM | 5/6 |
|  |  | 14 | BPSK + DCM + DUP | 1/2 |
|  |  | 15 | BPSK + DCM | 1/2 |

TABLE 3

| IEEE 802.11be (DSSS) Data Rate | Modulation |
|---|---|
| Basic Rate | 1 Mbps DBPSK |
| Enhanced Rate | 2 Mbps DQPSK |
| HR Rate 1 | 5.5 Mbps CCK |
| HR Rate 2 | 11 Mbps CCK |

TABLE 4

| Non-HT OFDM MCSs | Modulation | Coding |
|---|---|---|
| 0 | BPSK | 1/2 |
| 1 | BPSK | 3/4 |
| 2 | QPSK | 1/2 |
| 3 | QPSK | 3/4 |
| 4 | 16 QAM | 1/2 |
| 5 | 16 QAM | 3/4 |
| 6 | 64 QAM | 2/3 |
| 7 | 64 QAM | 3/4 |

Referring back to FIG. 36, the group frames information subfield may specify group frames transmission parameters of the reported access point, including: the group PPDU type (e.g., using 3 bits) and the group MCS (e.g., using 5 bits), which define the group frames MCS of the reported access point; the broadcast RU with AID of 2046 or 2047 (e.g., using 1 bit), which indicate whether the reported access point transmits group frames in a broadcast RU of a DL HE MU PPDU; the group bandwidth (e.g., using 3 bits), which indicates the bandwidth of the transmitted group frames; the no group frames buffering (e.g., using 1 bit), which may be set to '1' if an access point transmits immediately the arrived group frames (in this operation, the access point may not transmit group frames after a DTIM beacon frame); the group frames transmission amount (e.g., using 2 bits), which signals whether an access point sends all, no or a partial set of group frames; and the access point change a group transmission mode (e.g., using 1 bit), which signals the number of DTIM beacon frames after which group frames transmission parameters will change.

For the group PPDU type: a value of '0' may indicate a non-HT PPDU; a value of '1' may indicate an ER SU PPDU; a value of '2' may indicate an HE SU PPDU; a value of '3' may indicate a non-HT duplicate PPDU; a value of '4' may indicate an HE MU PPDU; and values of '5' through '7' may be reserved. Moreover, for the group bandwidth: a value of '0' may indicate a 20 MHz bandwidth; a value of '1' may indicate a 40 MHz bandwidth; a value of '2' may indicate an 80 MHz bandwidth; a value of '3' may indicate a 160 MHz bandwidth; a value of '4' may indicate a 320 MHz bandwidth; and values of '5' through '7' may be reserved. Furthermore, for the group frames transmission amount: a value of '0' may indicate that all frames are transmitted; a value of '1' may indicate that no group frames are transmitted; and a value of '2' may indicate that some frames are only groupcast with retries (GRC) transmitted. Additionally, for the access point change a group transmission mode: a value of '0' may signal no change is coming; and if the value is greater than '0,' then the access point may include two group information subfields/elements, where the first includes the current parameters and the second includes the new values.

We now describe embodiments in which the transmission power may be configured. In the 6 GHz band of frequencies, the regulatory maximum transmit power of an access point and non-AP station may change. Typically, the same transmit power is used for all frames. Note that the access point transmit power and the station transmit power effect the BSS range and interference with neighboring electronic devices. As described further below, in the disclosed communication techniques, a transmission power envelope for an access point in an AP MLD that is operating in the 6 GHz band of frequencies may be included in a per-station profile in the RNR.

Notably, in the 6 GHz band of frequencies, the RNR may include the maximum station transmit power for the primary 20 MHz channel, for link setup or a probe request. Moreover, in the 6 GHz band of frequencies, the transmitting access point may signal its transmit power and device type in a transmission power envelope and country element.

In some embodiments of the communication techniques, stations that receive a beacon frame from a low-power indoor (LPI) access point can use the higher LPI client transmit power in the 6 GHz band of frequencies. The beacon frame may also be received on other channels or in other bands of frequencies. Moreover, OoB information associated with the LPI access point may simplify the use of LPI station power levels by the station in the 6 GHz band of frequencies.

In order to facilitate these embodiments (and to support regulation, e.g., from the Federal Communication Commission), additional 6 GHz device types may be defined. Notably, in addition to an indoor access point (which may be indicated by a value of '0'), a low power indoor access point (which may be indicated by a value of '0') and a standard power access point (which may be indicated by a value of '1'), there may be: a very low power access point (which may be indicated by a value of '2'), a client-to-client device (which may be indicated by a value of '3') and/or an indoor standard power access point (which may be indicated by a value of '4'). Note that a very low power access point may be an access point whose operation does not require control from an external system (such as an automated frequency coordination or AFC system), is not subject to additional regulatory requirements making outdoor operation difficult or prohibited, and is typically restricted to very low transmit power. Moreover, a client-to-client device may be an access point whose operation relies on being able to successfully receive an enabling signal (as defined by the regulatory rules) from an indoor access point or an indoor standard power access point. Furthermore, an indoor standard power access point may be an access point whose operation requires control from an external system (such as an AFC system) and is subject to additional regulatory requirements making outdoor operation difficult or prohibited.

Moreover, Table 5 provide maximum power levels (e.g., a maximum effective isotropic radiated power or EIRP) for different access-point devices classes and channel sizes.

TABLE 5

| Device Class | Maximum EIRP | Maximum EIRP Power Spectral Density | Channel Size/Maximum EIRP | Transmission Power Type |
|---|---|---|---|---|
| Standard-Power Access Point and Fixed Client (AFC Controlled) | 36 dBm | 23 dBm/MHz | 320 MHz/36 dBm<br>160 MHz/36 dBm<br>80 MHz/36 dBm<br>40 MHz/36 dBm<br>20 MHz/36 dBm | AFC can configure the maximum EIRP power in 3 dBm steps from 36 dBm down to 21 dBm, e.g., the maximum EIRP power is 36, 33, 30, 27, 24 or 21 dBm |
| Client Connected to Standard-Power Access Point | 30 dBm | 17 dBm/MHz | 320 MHz/30 dBm<br>160 MHz/30 dBm<br>80 MHz/30 dBm<br>40 MHz/30 dBm<br>20 MHz/30 dBm | The client maximum EIRP power is 6 dB lower than access point power, e.g., the maximum EIRP power is 30, 27, 24, 21, 18 or 15 dBm |
| Low-Power Access Point (Indoor Only) | 30 dBm | 5 dBm/MHz | 320 MHz/30 dBm<br>160 MHz/27 dBm<br>80 MHz/24 dBm<br>40 MHz/21 dBm<br>20 MHz/18 dBm | Defines the single maximum transmission power level |
| Client Connected to Low-Power Access Point | 24 dBm | −1 dBm/MHz | 320 MHz/24 dBm<br>160 MHz/21 dBm<br>80 MHz/18 dBm<br>40 MHz/15 dBm<br>20 MHz/12 dBm | Defines the single maximum transmission power level |
| Very-Low Power Unlicensed Device | 14 dBm | −8 dBm/MHz | 320 MHz/14 dBm<br>160 MHz/14 dBm<br>80 MHz/11 dBm<br>40 MHz/8 dBm<br>20 MHz/5 dBm | Defines the single maximum transmission power level |

Furthermore, in the communication techniques a transmission power or an access point may be updated. Notably, an access point may use a TPC report element to signal its transmission power level, unless the access point transmits at regulatory maximum transmission power. The TPC report element may signal the transmission power level of an access point for all frames. Thus, the access point may use this transmission power level to transmit all of its frames (e.g., in at least the 6 GHz band of frequencies), including its beacon and group frames. Consequently, there may not be a need to add a separate field for beacon transmit power.

Figure 38:
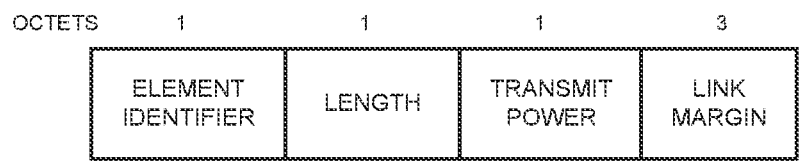
FIG. 38 is a drawing illustrating an example of a transmission power control (TPC) report element.

As shown in FIG. 38, which presents a drawing illustrating an example of a TPC report element 3810, TPC report element 3810 may include: an element identifier (e.g., using 1 octet), a length (e.g., using 1 octet), the transmit power (e.g., using 1 octet) and/or a link margin (e.g., using 1 octet). The transmit power field may be set to the transmit power used to transmit the frame containing TPC report element 3810. This field may be coded as a 2s-complement signed integer in units of decibels relative to 1 mW. The tolerance for the transmit power value reported in TPC report element 3810 may be ±5 dB. This tolerance may be defined as the difference, in decibels, between the reported power value and the actual EIRP of a station (when transmitting 1500 octet frames or the maximum MAC protocol data unit (MPDU)-sized frames, whichever is smaller).

Additionally, the link margin field may include the link margin for the receive time and for the receive rate of the frame containing the TPC request element or the link measurement request frame. The field may be coded as a 2s-compliment signed integer in units of decibels. Note the link margin field may be reserved when a TPC report element is included in a beacon frame or a probe response frame.

In the communication techniques, a variety of signaling may be used to convey associated configuration parameters. Notably, as described previously, an AP MLD may signal the group beacon and/or group frames transmission parameters it transmits. These capabilities may allow a station to detect the current beacon and/or group transmission parameter values, and may provide signaling for legacy (non-IEEE 802.11be) and IEEE 802.11be-compliant stations. Moreover, as described further below, an AP MLD may signal a changed or an upcoming beacon and/or group frames transmission parameters change time and the transmission parameter values after the transition. These capabilities may allow stations to detect or prepare for the upcoming parameters change, which may provide more reliable BSS operation. Furthermore, as described further below, an AP MLD may request a transmission mode for beacon and/or group frames. These capabilities may allow stations to specify how an access point should transmit beacons and/or group-addressed frames, and thus to improve or optimize beacon and/or group frames transmission parameters. Additionally, as described further below, an AP MLD may configure allowed beacon and/or group transmission parameter changes and may setup a reporting scheme or technique for beacon frame and/or group frame reception by one or more station(s). These capabilities may allow an AP MLD to change beacon and/or group frames transmission parameters to change for only some affiliated access points. Note that non-AP MLDs can also report the links in which they can operate.

Furthermore, a change sequence number (CSN) may be used by an access point to communicate a critical BSS parameter update to a station. Notably, a non-AP MLD may receive beacon frames on any link. In order to reduce non-AP MLD power consumption, a change sequence in the RNR and/or the ML element in a beacon frame may be a counter for affiliated AP-specific critical operating parameter update. An additional or modified value may indicate that a link-specific parameter value is changed. In some embodiments, if a critical capability update flag subfield is set to '1' to indicate that a change sequence value of any affiliated access point of the AP MLD or an ML element parameter have changed. Note that each transmit and non-transmit BSS may have its own critical capability update flag.

Figure 39A:
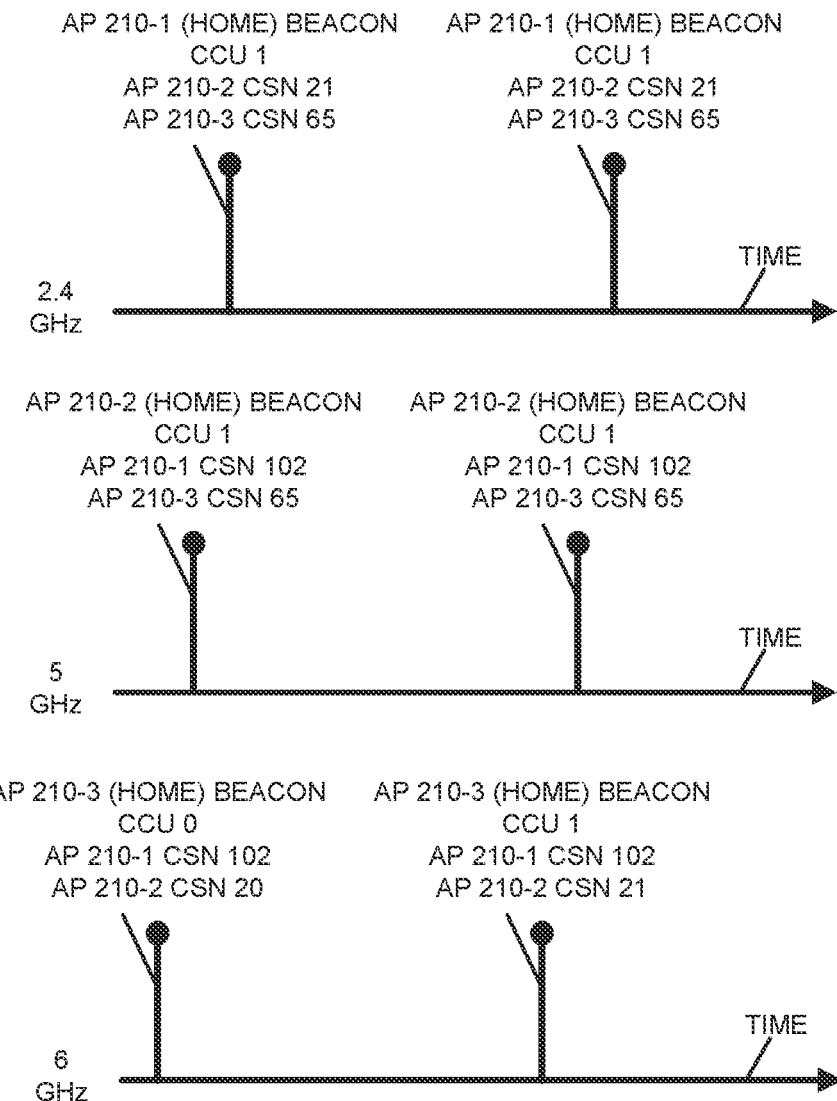
FIG. 39A is a drawing illustrating an example of communication between electronic devices.
Figure 39B:
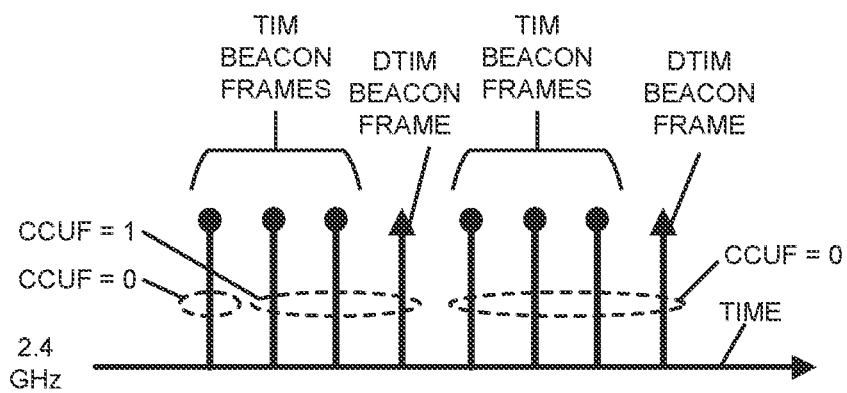
FIG. 39B is a drawing illustrating an example of communication between electronic devices.

For example, as shown in FIGS. 39A and 39B, which presents a drawing illustrating an example of communication between electronic devices, access point 210-1 operating in the 2.4 GHz band of frequencies may transmit traffic indication message (TIM) beacon frames that indicate access point 210-1 has a critical capability update value of '1', access point 210-2 has a change sequence number of 21, and access point 210-3 has a change sequence number of 65. Moreover, access point 210-2 operating in the 5 GHz band of frequencies may transmit TIM beacon frames that indicate access point 210-2 has a critical capability update value of '1', access point 210-1 has a change sequence number of 102, and access point 210-3 has a change sequence number of 65. Thus, these beacon frames may indicate parameter value changes for the change sequence number of access point 210-1. Furthermore, access point 210-3 operating in the 6 GHz band of frequencies may transmit a first TIM beacon frame that indicates access point 210-2 has a critical capability update value of '0', access point 210-1 has a change sequence number of 102, and access point 210-2 has a change sequence number of 20. Then, access point 210-3 operating in the 6 GHz band of frequencies may transmit a second TIM beacon frame that indicates access point 210-2 has a critical capability update value of '1', access point 210-1 has a change sequence number of 102, and access point 210-2 has a change sequence number of 21.

Additionally, access point 210-1 operating in the 2.4 GHz band of frequencies may transmit a TIM beacon frame with a critical capability update flag of '0'. Then, when a parameter change for access point 210-2 occurs, access point 210-1 may transmit TIM beacon frames and a DTIM beacon frame with a critical update flag of '1.' Subsequently, access point 210-1 may transmit TIM beacon frames and a DTIM beacon frame with a critical update flag of '0.'

Moreover, in the communication techniques, modified beacon and/or group frames type information values may increase the change sequence number. Notably, if an AP updates its transmission power, beacon frame type information and/or group frame type information element, then: an AP-specific change sequence number may be increased. When an associated non-AP MLD detects that the change sequence number value has changed, then it may receive the updated AP-specific parameters.

Figure 40A:
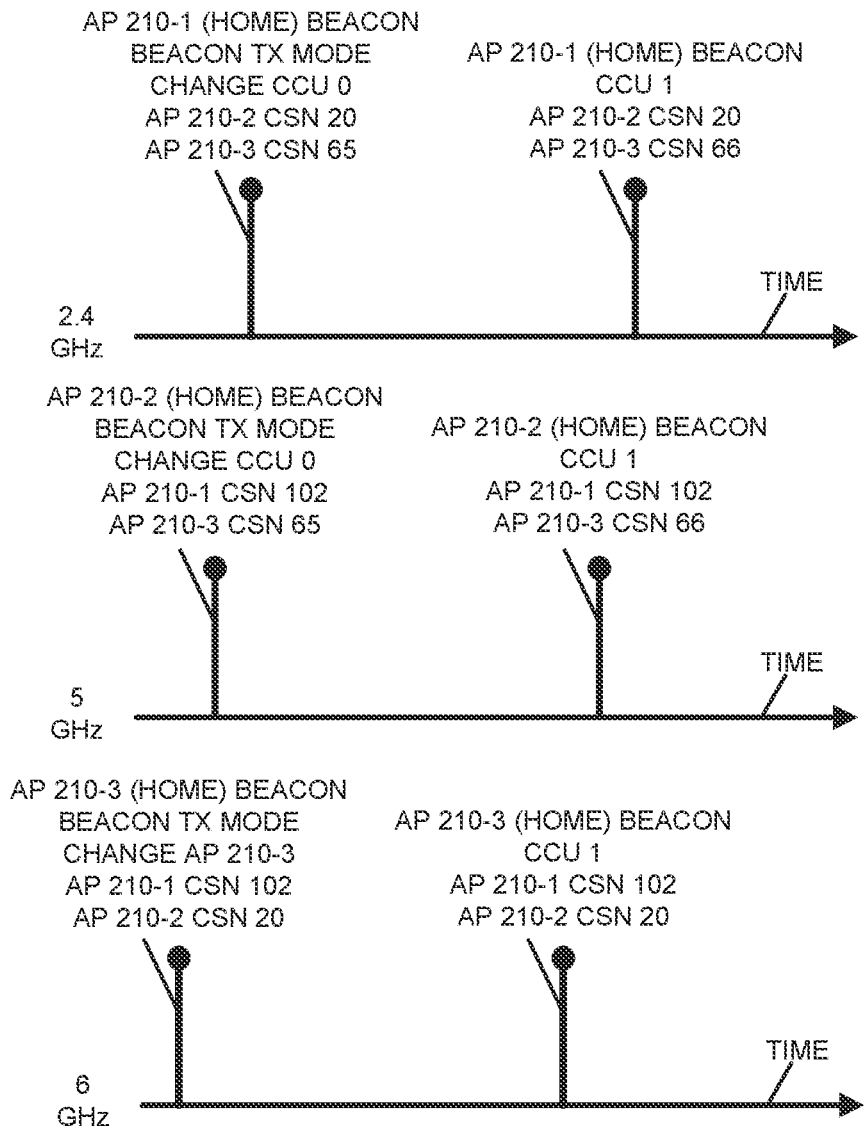
FIG. 40A is a drawing illustrating an example of communication between electronic devices.
Figure 40B:
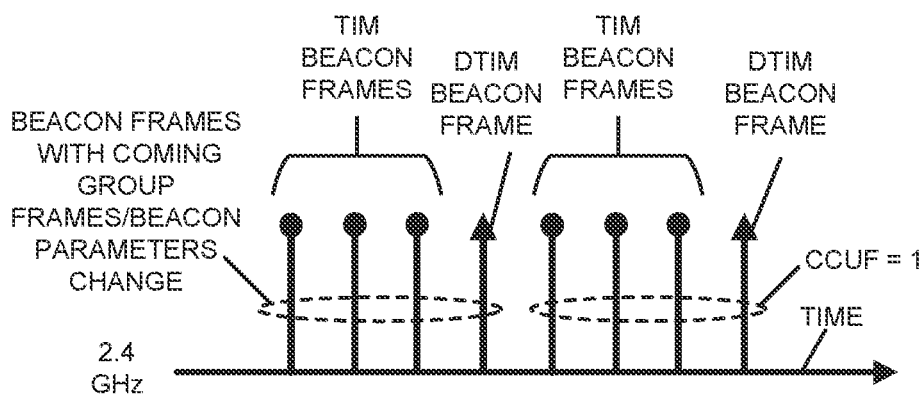
FIG. 40B is a drawing illustrating an example of communication between electronic devices.

This is shown in FIGS. 40A and 40B, which presents a drawing illustrating an example of communication between electronic devices. Notably, access point 210-2 operating in the 5 GHz band of frequencies may transmit TIM beacon frames that indicate access point 210-2 has a critical capability update value of '1', access point 210-1 has a change sequence number of 102, and access point 210-3 has a change sequence number of 65. Thus, these beacon frames may indicate beacon transmission parameter value changes for the change sequence number of access point 210-1.

Furthermore, the AP MLD may signal an upcoming beacon and/or group transmission model change. Notably, the updated information element may be added to the beacon frames and/or probe responses the access point transmits. The other affiliated access points may include the updated beacon and/or group frames transmission parameters to their beacon frames. Note that the information may be added or included before the actual transmission mode change occurs. In some embodiments, the access point may update the group frames transmission parameters in a TIM beacon frame multiple beacon intervals before the next DTIM. This may provide time for associated stations to select the DTIM beacon frame they receive. A station may signal that it is not capable to receive in the updated mode by requesting a lower transmission mode. In response, an access point may cancel the transmission mode change, if many stations signal that they cannot receive the transmissions on the updated mode.

For example, access point 210-1 operating in the 2.4 GHz band of frequencies may transmit a first TIM beacon frame that indicates access point 210-1 has a beacon transmission mode change and a critical capability update value of '0', access point 210-2 has a change sequence number of 20, and access point 210-3 has a change sequence number of 65. Then, access point 210-1 may transmit a second TIM beacon frame that indicates access point 210-1 has a critical capability update value of '1', access point 210-2 has a change sequence number of 20, and access point 210-3 has a change sequence number of 66. Moreover, access point 210-2 operating in the 5 GHz band of frequencies may transmit a first TIM beacon frame that indicates access point 210-2 has a beacon transmission mode change and a critical capability update value of '0', access point 210-1 has a change sequence number of 102, and access point 210-3 has a change sequence number of 65. Then, access point 210-2 may transmit a second TIM beacon frame that indicates access point 210-2 has a critical capability update value of '1', access point 210-1 has a change sequence number of 102, and access point 210-3 has a change sequence number of 66. Furthermore, access point 210-3 operating in the 6 GHz band of frequencies may transmit a first TIM beacon frame that indicates access point 210-3 has a beacon transmission mode change, access point 210-1 has a change sequence number of 102, and access point 210-2 has a change sequence number of 20. Then, access point 210-3 may transmit a second TIM beacon frame that indicates access point 210-3 has a critical capability update value of '1', access point 210-1 has a change sequence number of 102, and access point 210-2 has a change sequence number of 20. Thus, the second TIM beacon frame transmitted by access point 210-3 may indicate beacon transmit parameter changes.

Additionally, access point 210-3 operating in the 6 GHz band of frequencies may transmit TIM beacon frames and a DTIM beacon frame with upcoming beacon and/or group-addressed frames transmit parameter changes. Then, access point 210-3 may transmit TIM beacon frames and a DTIM beacon frame with a critical capability update flag of '1'.

Figure 41:
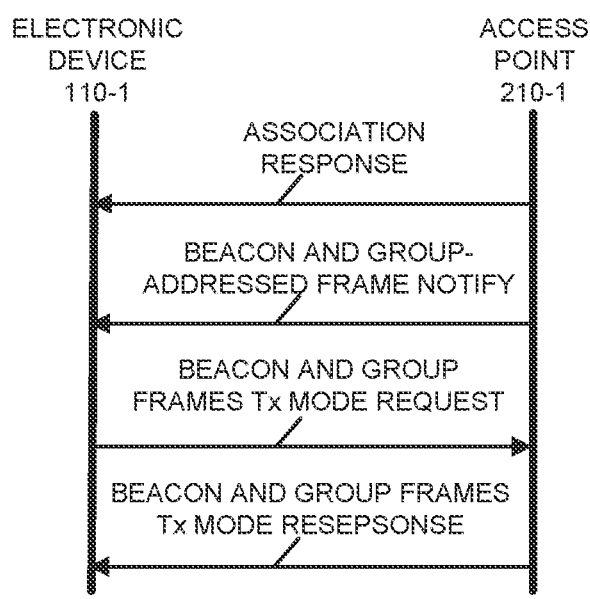
FIG. 41 is a drawing illustrating an example of communication between electronic devices.

As shown in FIG. 41, which presents a drawing illustrating an example of communication between electronic devices, in some embodiments a station may request the beacon and/or group frames transmission mode. Notably, an access point (such as access point 210-1) may signal support for beacon and/or group frames transmission mode requests. For example, in an association response (when a station is not yet associated), an access point in an AP MLD may communicate a beacon and/or group frames reporting condition and a maximum/minimum range to a station in a non-AP MLD (such as electronic device 110-1). Alternatively, when the station is already associated, the access point in the AP MLD may, in a beacon and group-addressed frames notify, inform the station of the reporting condition and the maximum/minimum range. In some embodiments, the station may optionally transmit a beacon and group frames transmission mode request, including: the link, a minimum transmission mode, a maximum transmission mode, and/or a receive history with a number of beacon and/or group frames received, and the links from which the frames are received. Moreover, the AP MLD may transmit a beacon and group frames transmission mode response, including: success, reporting conditions, a number of links, and a table with information specifying: links, minimum transmission modes and maximum transmission modes.

Thus, an access point may signal the affiliated access points which beacon and/or group frames transmission modes may be changed based on station requests. Moreover, the access point may: signal the maximum and minimum transmission modes and data rates for group frames and beacon frames it allows for links; and/or signal whether the access point may send some or all group frames as unicast frame copies for station(s) and/or non-AP MLD(s) that request unicast copies. Note that the access point may request an autonomous measurement setup (e.g., signal that the access point receives beacon and group reception quality report frames). The access point may specify a condition when a station reports suitable beacon and/or group frames transmission modes and/or to provide a reception history of the frames to the access point. For example, consecutive failed/successful beacon receive operations, or DTIM beacon frames without any group-addressed frames may trigger a report transmission to the access point. In some embodiments, the station may transmit unsolicited receive statistics of the beacon frames and/or group frames or solicited receive statistics.

Figure 42:
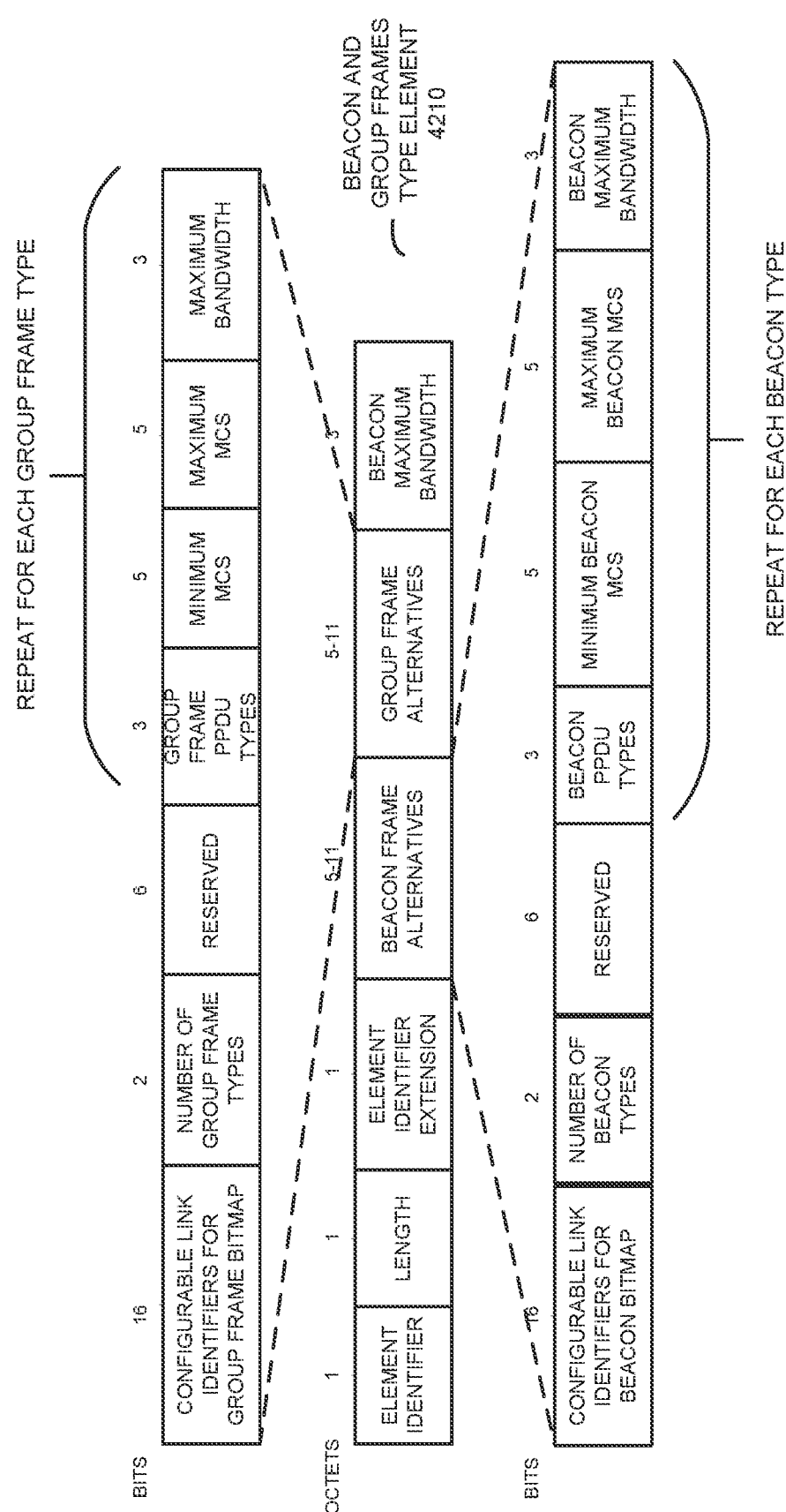
FIG. 42 is a drawing illustrating an example of a beacon and group frames type element.

In some embodiments, configurable link parameters that may be included in the association response or the beacon and group-addressed frames notify of FIG. 41. Notably, the beacon and group frame types element may be added to the association response and beacon frames. For example, as shown in FIG. 42, which presents a drawing illustrating an example of a beacon and group frames type element 4210, the beacon and group frames type element 4210 may include: an element identifier (e.g., using 1 octet), a length (e.g., using 1 octet), an element identifier extension (e.g., using 1 octet), beacon frame alternatives (e.g., using 5-11 octets), group frame alternatives (e.g., using 5-11 octets) and a beacon maximum bandwidth (e.g., using 3 octets). Moreover, for a beacon frame, the beacon and group frames type element 4210 may include: configurable link identifiers for beacon bitmap (e.g., using 16 bits), a number of beacon types (e.g., using 2 bits), 6 reserved bits, and one or more instances (depending on the number of beacon frame types) of: a beacon PPDU type (e.g., using 3 bits), a minimum beacon MCS (e.g., using 5 bits), a maximum beacon MCS (e.g., using 5 bits), and a beacon maximum bandwidth (e.g., using 3 bits). Alternatively, for a group-addressed frame, the beacon and group frames type element 4210 may include: configurable link identifiers for group frames bitmap (e.g., using 16 bits), a number of group frame types (e.g., using 2 bits), 6 reserved bits, and one or more instances (depending on the number of beacon group frame types) of: a group frame PPDU type (e.g., using 3 bits), a minimum MCS (e.g., using 5 bits), a maximum MCS (e.g., using 5 bits), and a maximum bandwidth (e.g., using 3 bits).

Thus, the beacon and group frame types element may specify the allowed beacon frame and/or group frame configurations for the links. Note that a link identifier bitmap may have a value '1' if the link can be configured. Moreover, instances of the element for group-addressed frames may include one or more instances of a group frame PPDU type, a minimum group frame MCS, a maximum group frame MCS and a maximum group frame bandwidth. Therefore, the number of beacon and/or group frame types may define the number of PPDU type, a minimum and a maximum MCS, and bandwidth fields that may be configured for the AP MLD. In some embodiments, the non-AP station may propose an MCS that is within the minimum and the maximum MCS.

Referring back to FIG. 41, for a beacon and group frames transmission mode from a station, a non-AP MLD or station may request a beacon and/or group-addressed frames transmission mode from an access point. The request may include minimum and maximum transmission modes separately for beacon and/or group frames. Note that a request may be for one specific link or for any link. The request may specify multiple alternative transmission modes for beacon and/or group frames. An access point may select one of the transmission modes for beacon frames and one transmission mode for group frames. The multiple transmission modes may allow the station to specify a range of transmission rates that are acceptable for it. In some embodiments, the request may include non-AP MLD receive histories for beacon frames and/or group frames. Each receive history may list the link in which station has received beacons and/or group frames and the number of successful receptions in the last X seconds, where X is an integer or a real number (such as a time interval between 0.1 and 10 s). For group-addressed frames, the station may request a directed multicast service (DMS), in which a multicast frame transmission is unicast for the station.

Additionally, in a beacon and group frames transmission mode response from an access point, an AP MLD may respond to a station request. In the response, the AP MLD may accept, reject or propose alternative parameters for the beacon and/or group frames transmission mode of the requested access points. The AP MLD may decide transmission rates of the affiliated access points based at least in part on station(s) requests. Moreover, the AP MLD may dedicate some affiliated access points to have higher rates. Note that the access point may delay the beacon and/or group frames transmission parameters change. In particular, the access point may transmit a BSS transition management frame to selected associated stations to request transition to another access point or AP MLD if modified beacon and/or group frames transmission parameters cause difficulties when receiving the frames. Alternatively or additionally, the access point may signal upcoming beacon and/or group frames transmission parameters changes for non-AP MLDs to allow them to select the link for beacon and/or group frames reception.

In summary, the disclosed communication techniques provide an information element to signal the beacon frames transmission mode and/or group frames transmission modes. Moreover, the use of the information elements is illustrated for stations that operate data and scanning radios. The disclosed communication techniques allow a station to request beacon and/or group-addressed frames transmission parameters changes. This capability may be used to improve or optimize the stand-by power consumption and/or network reliability of the station.

Note that the formats of packets or frames communicated during the communication techniques may include more or fewer bits, subfields or fields. Alternatively or additionally, the position of information in these packets or frames may be changed. Thus, the order of the subfields or fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots. In some embodiments, the communication techniques may use OFDMA.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 60 GHz frequency band, a Citizens Broadband Radio Service (CBRS) frequency band, a band of frequencies used by LTE or another data communication protocol, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 43 presents a block diagram of an electronic device 4300 (which may be a cellular telephone, a smartwatch, an access point, a wireless speaker, an IoT device, another electronic device, etc.) in accordance with some embodiments. This electronic device includes processing subsystem 4310, memory subsystem 4312 and networking subsystem 4314. Processing subsystem 4310 includes one or more devices configured to perform computational operations. For example, processing subsystem 4310 can include one or more microprocessors, application-specific integrated circuits (ASICs), microcontrollers, graphics processing units (GPUs), programmable-logic devices, and/or one or more digital signal processors (DSPs).

Memory subsystem 4312 includes one or more devices for storing data and/or instructions for processing subsystem 4310, and/or networking subsystem 4314. For example, memory subsystem 4312 can include dynamic random access memory (DRAM), static random access memory (SRAM), a read-only memory (ROM), flash memory, and/or other types of memory. In some embodiments, instructions for processing subsystem 4310 in memory subsystem 4312 include: program instructions or sets of instructions (such as program instructions 4322 or operating system 4324), which may be executed by processing subsystem 4310. For example, a ROM can store programs, utilities or processes to be executed in a non-volatile manner, and DRAM can provide volatile data storage, and may store instructions related to the operation of electronic device 4300. Note that the one or more computer programs may constitute a computer-program mechanism, a computer-readable storage medium or software. Moreover, instructions in the various modules in memory subsystem 4312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 4310. In some embodiments, the one or more computer programs are distributed over a network-coupled computer system so that the one or more computer programs are stored and executed in a distributed manner.

In addition, memory subsystem 4312 can include mechanisms for controlling access to the memory. In some embodiments, memory subsystem 4312 includes a memory hierarchy that comprises one or more caches coupled to a memory in electronic device 4300. In some of these embodiments, one or more of the caches is located in processing subsystem 4310.

In some embodiments, memory subsystem 4312 is coupled to one or more high-capacity mass-storage devices (not shown). For example, memory subsystem 4312 can be coupled to a magnetic or optical drive, a solid-state drive, or another type of mass-storage device. In these embodiments, memory subsystem 4312 can be used by electronic device 4300 as fast-access storage for often-used data, while the mass-storage device is used to store less frequently used data.

Networking subsystem 4314 includes one or more devices configured to couple to and communicate on a wired and/or wireless network (i.e., to perform network operations), such as: control logic 4316, one or more interface circuits 4318 and a set of antennas 4320 (or antenna elements) in an adaptive array that can be selectively turned on and/or off by control logic 4316 to create a variety of optional antenna patterns or 'beam patterns.' Alternatively, instead of the set of antennas, in some embodiments electronic device 4300 includes one or more nodes 4308, e.g., a pad or a connector, which can be coupled to the set of antennas 4320. Thus, electronic device 4300 may or may not include the set of antennas 4320. For example, networking subsystem 4314 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 4314 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 4314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 4300 may use the mechanisms in networking subsystem 4314 for performing simple wireless communication between the electronic devices, e.g., transmitting advertising or frame frames and/or scanning for advertising frames transmitted by other electronic devices.

Within electronic device 4300, processing subsystem 4310, memory subsystem 4312 and networking subsystem 4314 are coupled together using bus 4328 that facilitates data transfer between these components. Bus 4328 may include an electrical, optical, and/or electro-optical connection that the subsystems can use to communicate commands and data among one another. Although only one bus 4328 is shown for clarity, different embodiments can include a different number or configuration of electrical, optical, and/or electro-optical connections among the subsystems.

In some embodiments, electronic device 4300 includes a display subsystem 4326 for displaying information on a display, which may include a display driver and the display, such as a liquid-crystal display, a multi-touch touchscreen, etc. Display subsystem 4326 may be controlled by processing subsystem 4310 to display information to a user (e.g., information relating to incoming, outgoing, or an active communication session).

Moreover, electronic device 4300 can also include a user-input subsystem 4330 that allows a user of the electronic device 4300 to interact with electronic device 4300. For example, user-input subsystem 4330 can take a variety of forms, such as: a button, keypad, dial, touch screen, audio input interface, visual/image capture input interface, input in the form of sensor data, etc.

Electronic device 4300 can be (or can be included in) any electronic device with at least one network interface. For example, electronic device 4300 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 4300, in alternative embodiments, different components and/or subsystems may be present in electronic device 4300. For example, electronic device 4300 may include one or more additional processing subsystems, memory subsystems, networking subsystems, and/or display subsystems. Additionally, one or more of the subsystems may not be present in electronic device 4300. Moreover, in some embodiments, electronic device 4300 may include one or more additional subsystems that are not shown in FIG. 43. In some embodiments, electronic device may include an analysis subsystem that performs at least some of the operations in the communication techniques. Also, although separate subsystems are shown in FIG. 43, in some embodiments some or all of a given subsystem or component can be integrated into one or more of the other subsystems or component(s) in electronic device 4300. For example, in some embodiments program instructions 4322 are included in operating system 4324 and/or control logic 4316 is included in the one or more interface circuits 4318.

Moreover, the circuits and components in electronic device 4300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 4314. This integrated circuit may include hardware and/or software mechanisms that are used for transmitting wireless signals from electronic device 4300 and receiving signals at electronic device 4300 from other electronic devices. Aside from the mechanisms herein described, radios are generally known in the art and hence are not described in detail. In general, networking subsystem 4314 and/or the integrated circuit can include any number of radios. Note that the radios in multiple-radio embodiments function in a similar way to the described single-radio embodiments.

In some embodiments, networking subsystem 4314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 4322, operating system 4324 (such as a driver for an interface circuit in networking subsystem 4314) or in firmware in an interface circuit networking subsystem 4314. Alternatively or additionally, at least some of the operations in the communication techniques may be implemented in a physical layer, such as hardware in an interface circuit in networking subsystem 4314. In some embodiments, the communication techniques are implemented, at least in part, in a MAC layer and/or in a physical layer in an interface circuit in networking subsystem 4314.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    an antenna node configured to communicatively couple to an antenna;
    a data radio communicatively coupled to the antenna node;
    a second antenna node configured to communicatively couple to a second antenna; and
    a second data radio communicatively coupled to the second antenna node, wherein the electronic device is configured to:
        communicate, using the data radio, frames in a band of frequencies that are associated with a second electronic device, wherein the data radio is configured to transmit the frames, receive the frames, or both;
        interrupt the communication of the frames;
        perform, using the second data radio, a scan of a second band of frequencies, wherein the second data radio is configured to transmit second frames, receive the second frames, or both;
        receive, using the second data radio, a beacon frame associated with a third electronic device in the second band of frequencies; and
        after the beacon frame is received, resume communication of third frames in the band of frequencies using the data radio.

2. The electronic device of claim 1, wherein the electronic device is not associated with the third electronic device.

3. The electronic device of claim 1, wherein the second electronic device and the third electronic device comprises access points that are co-hosted or co-located in, or affiliated with, an access point multi-link device (AP MLD).

4. The electronic device of claim 1, wherein the frames comprise a frame that comprises information associated with operation of the third electronic device in the second band of frequencies and the scan is based at least in part on the information.

5. The electronic device of claim 4, wherein the frame comprises a group-addressed frame.

6. The electronic device of claim 4, wherein the frame comprises a reduced neighbor report (RNR) and the RNR comprises the information, or the frame comprises a multi-link (ML) element and the ML comprises the information.

7. The electronic device of claim 4, wherein the information comprises: a primary channel of the third electronic device, a bandwidth of the beacon frame, or an indication of whether the third electronic device receives an 80 MHz wide non-high-throughput duplicate PPDU.

8. An integrated circuit, comprising:
    an antenna node configured to communicatively couple to an antenna;
    a data radio communicatively coupled to the antenna node;
    a second antenna node configured to communicatively couple to a second antenna; and
    a second data radio communicatively coupled to the second antenna node, wherein the integrated circuit is configured to:
        communicate, using the data radio, frames in a band of frequencies that are associated with an electronic device, wherein the data radio is configured to transmit the frames, receive the frames, or both;
        interrupt the communication of the frames;
        perform, using the second data radio, a scan of a second band of frequencies, wherein the second data radio is configured to transmit second frames, receive the second frames, or both;
        receive, using the second data radio, a beacon frame associated with a second electronic device in the second band of frequencies; and
        after the beacon frame is received, resume communication of third frames in the band of frequencies using the data radio.

9. The integrated circuit of claim 8, wherein the integrated circuit is not associated with the second electronic device.

10. The integrated circuit of claim 8, wherein the electronic device and the second electronic device comprises access points that are co-hosted or co-located in, or affiliated with, an access point multi-link device (AP MLD).

11. The integrated circuit of claim 8, wherein the frames comprise a frame that comprises information associated with operation of the second electronic device in the second band of frequencies and the scan is based at least in part on the information.

12. The integrated circuit of claim 11, wherein the frame comprises a group-addressed frame.

13. The integrated circuit of claim 11, wherein the frame comprises a reduced neighbor report (RNR) and the RNR comprises the information, or the frame comprises a multi-link (ML) element and the ML comprises the information.

14. The integrated circuit of claim 11, wherein the information comprises: a primary channel of the second electronic device, a bandwidth of the beacon frame, or an indication of whether the second electronic device receives an 80 MHz wide non-high-throughput duplicate PPDU.

15. A method for performing a scan, the method comprising:

by an electronic device:
communicating, using a data radio, frames in a band of frequencies that are associated with a second electronic device, wherein the data radio transmits the frames, receives the frames, or both;
interrupting the communication of the frames;
performing, using a second data radio, the scan of a second band of frequencies, wherein the second data radio transmits second frames, receives the second frames, or both;
receiving, using the second data radio, a beacon frame associated with a third electronic device in the second band of frequencies; and
after the beacon frame is received, resuming communication of third frames in the band of frequencies using the data radio.

16. The method of claim 15, wherein the electronic device is not associated with the third electronic device.

17. The method of claim 15, wherein the second electronic device and the third electronic device comprises access points that are co-hosted or co-located in, or affiliated with, an access point multi-link device (AP MLD).

18. The method of claim 15, wherein the frames comprise a frame that comprises information associated with operation of the third electronic device in the second band of frequencies and the scan is based at least in part on the information.

19. The method of claim 18, wherein the frame comprises a group-addressed frame.

20. The method of claim 18, wherein the frame comprises a reduced neighbor report (RNR) and the RNR comprises the information, or the frame comprises a multi-link (ML) element and the ML comprises the information.

* * * * *